US006826138B2

(12) United States Patent
Abrahamson et al.

(10) Patent No.: US 6,826,138 B2
(45) Date of Patent: Nov. 30, 2004

(54) METHOD FOR ALIGNING ACTUATOR ASSEMBLY TO A BASE IN A MINIATURE OPTICAL DISK DRIVE

(75) Inventors: Scott D. Abrahamson, Longmont, CO (US); Robert D. Freeman, Erie, CO (US); Edmund Harbuz, Longmont, CO (US); Brian Lee Rappel, Lyons, CO (US); Peter J. Raymond, Erie, CO (US)

(73) Assignee: DPHI Acquisitions, Inc., Boulder, CO (US)

( * ) Notice: Subject to any disclaimer, the term of this patent is extended or adjusted under 35 U.S.C. 154(b) by 602 days.

(21) Appl. No.: 09/946,075

(22) Filed: Sep. 4, 2001

(65) Prior Publication Data

US 2003/0043717 A1 Mar. 6, 2003

(51) Int. Cl.[7] .............................................. G11B 21/08
(52) U.S. Cl. .................. 369/53.25; 369/222; 360/254.5
(58) Field of Search .......................... 369/53.25, 44.17, 369/44.18, 44.19, 222, 223, 236, 246, 247, 250, 233, 219; 360/254.2, 254.5, 254.9, 264.1, 264.2, 265.9, 265.2, 265.4, 265.6, 294.6, 294.7, 256.3, 256.4, 266.1

(56) References Cited

U.S. PATENT DOCUMENTS

| 4,855,853 | A | * | 8/1989 | Matsushita et al. ......... 360/265 |
| 4,893,206 | A | * | 1/1990 | Shtipelman et al. ...... 360/265.2 |
| 4,902,971 | A | * | 2/1990 | Guzik et al. ................. 369/223 |
| 4,995,025 | A | * | 2/1991 | Schulze ...................... 369/222 |
| 5,313,354 | A |   | 5/1994 | Sampietro et al. ........ 360/256.2 |
| 5,369,538 | A |   | 11/1994 | Moe et al. ................ 360/265.1 |
| 5,650,896 | A | * | 7/1997 | Viskochil .................. 360/265.7 |
| 5,844,754 | A | * | 12/1998 | Stefansky et al. ........ 360/266.1 |
| 5,864,449 | A |   | 1/1999 | Dominguez et al. ..... 360/265.1 |
| 6,078,475 | A | * | 6/2000 | Lawson .................... 360/265.2 |
| 6,442,000 | B1 | * | 8/2002 | Koong et al. ............. 360/256.4 |
| 6,480,361 | B1 |   | 11/2002 | Patterson ................. 360/254.3 |
| 6,498,706 | B1 | * | 12/2002 | Takekawa et al. ........ 360/264.5 |

FOREIGN PATENT DOCUMENTS

GB 2235330 A * 2/1991 ........... G11B/21/08

* cited by examiner

Primary Examiner—Thang V. Tran
(74) Attorney, Agent, or Firm—MacPherson, Kwok Chen & Heid LLP

(57) ABSTRACT

Disclosed is a method for aligning a rotating device such as an actuator assembly to a base of, for example, a disk drive. The device is rotatably mounted to the base about the pivot pin. The method may involve adjusting the angular position of the pivot pin relative to the base unless or until the actuator assembly rotates in a first plane parallel to a second plane containing a surface of the data storage disk. In one embodiment, the data storage disk is mounted for rotation on a disk rotation motor. The disk rotation motor, in turn, is mounted to a base. With the device positioned between the base and the data storage disk, the device is rotated about the pivot pin. While the device is rotated about the pivot pin, electrical current is provided to the device. The magnitude of the electrical current is proportional or inversely proportional to a distance D separating the device from the data storage disk. The electrical current is monitored as the device rotates about the pivot pin. When the monitored current is constant in magnitude as the device rotates about the pivot pin, the angle between the device and the base is such that the device should rotate in the first plane.

20 Claims, 35 Drawing Sheets

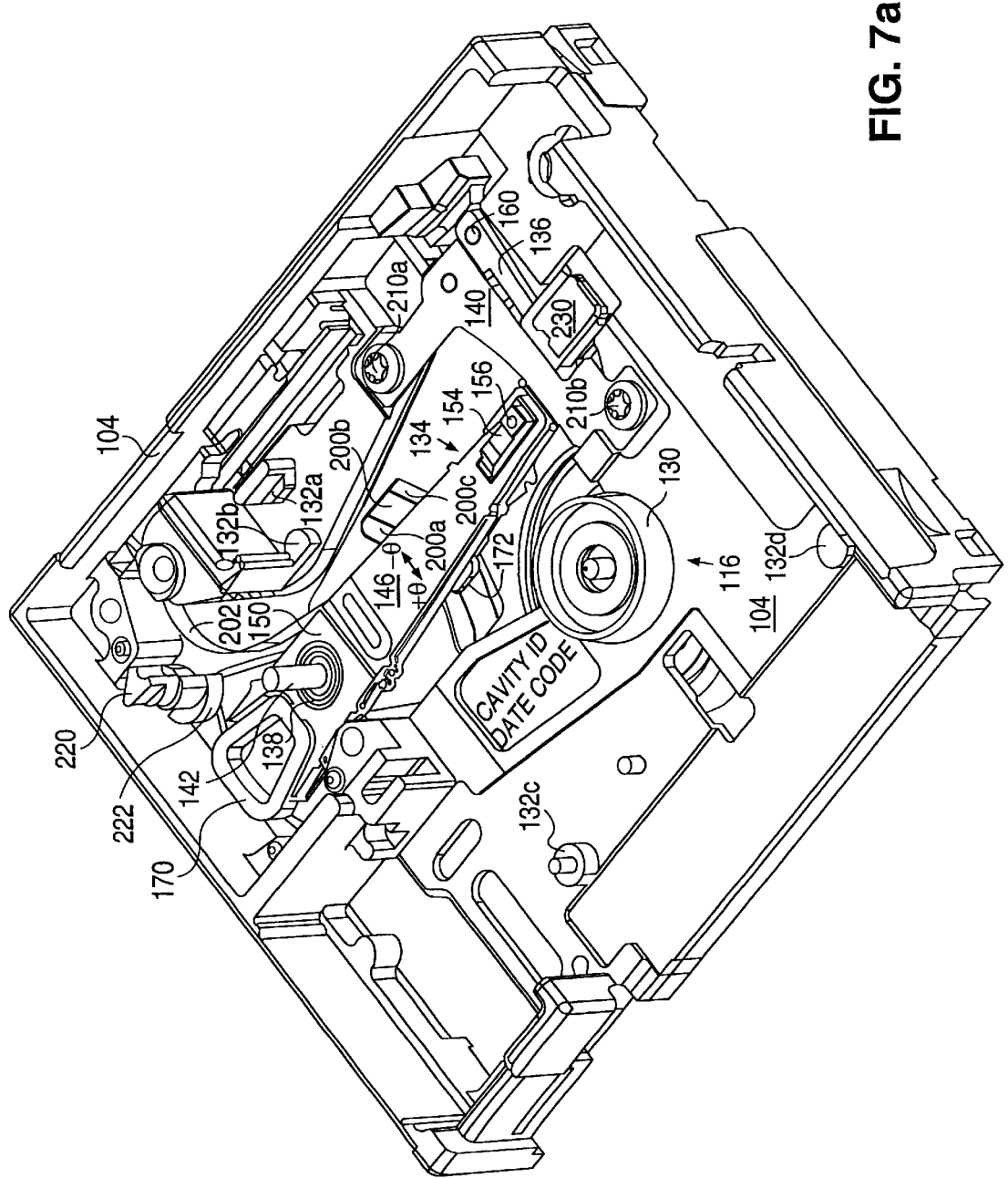

METHOD FOR ALIGNING ACTUATOR ASSEMBLY TO A BASE IN A MINIATURE OPTICAL DISK DRIVE

CROSS-REFERENCE TO RELATED APPLICATIONS

This application is related to application Ser. No. 09/854,333, filed May 11, 2001 entitled Optical Data Storage with Enhanced Contrast, application Ser. No. 09/946,845 filed Sep. 4, 2001, entitled Cartridge Load/Eject Mechanism for Data Storage Disk System; application Ser. No. 09/947,111 filed Sep. 4, 2001, entitled Focus Motor and Mechanism for Optical Disk Drive, application Ser. No. 60/265,830, filed Jan. 31, 2001, entitled Cartridge Loading Mechanism for Data Storage Disk and application Ser. No. 09/846,042, filed May 1, 2001, entitled Optical Pickup Unit Assembly Process all of which are incorporated herein in their entirety.

BACKGROUND OF THE INVENTION

Data storage/retrieval devices such as disk drives are well known in the industry. Disk drives store or retrieve digital data on a plurality of circular, concentric data tracks on the surfaces of a rigid data storage disk. The disk is typically mounted for rotation on the hub of a spindle motor. In disk drives of the current generation, the spindle motor can rotate the disk at speeds of up to 10,000 RPM.

Data is stored to or retrieved from the disk by an actuator that is controllably moved. The actuator typically includes of an electromagnetic transducer head carried on an actuator assembly. The actuator assembly moves the head from track to track and has assumed many forms historically, with most disk drives of the current generation incorporating an actuator assembly of the type referred to as a rotary voice coil actuator assembly. A typical rotary voice coil actuator assembly includes of a pivot pin fixedly attached to a disk drive base member. The pivot pin is mounted such that its central axis is normal to the plane of rotation of the disk. An actuator assembly frame can be mounted to the pivot pin by an arrangement of precision ball bearing assemblies, and supports a coil which is suspended in the magnetic field of an array of permanent magnets, which are fixedly mounted to the drive base member. When controlled DC current is applied to the coil, a magnetic field is formed surrounding the coil that interacts with the magnetic field of the permanent magnets to rotate the actuator assembly in accordance with the well-known Lorentz relationship.

As the actuator assembly rotates about the pivot pin, the head is moved across the data tracks along an arcuate path. If the pivot pin is not properly attached to the disk drive base member, the distance between the head and the data storage disk may vary as the actuator assembly moves along the arcuate path.

SUMMARY OF THE INVENTION

Disclosed is a method for aligning a rotating device such as an actuator assembly to a base of, for example, a disk drive. The device is rotatably mounted to the base about the pivot pin. The method may involve adjusting the angular position of the pivot pin relative to the base unless or until the actuator assembly rotates in a first plane parallel to a second plane containing a surface of the data storage disk.

In one embodiment, the data storage disk is mounted for rotation on a disk rotation motor. The disk rotation motor, in turn, is mounted to a base. With the device positioned between the base and the data storage disk, the device is rotated about the pivot pin. While the device is rotated about the pivot pin, electrical current is provided to the device. The magnitude of the electrical current is proportional or inversely proportional to a distance D separating the device from the data storage disk. The electrical current is monitored as the device rotates about the pivot pin. When the monitored current is constant in magnitude as the device rotates about the pivot pin, the angle between the device and the base is such that the device should rotate in the first plane.

In another embodiment the data storage disk is illuminated with light as the device rotates about the pivot pin. Light reflected from the data storage disk is detected. Signals corresponding to the detected light are generated as the device rotates about the pivot pin. These signals are monitored. When the monitored signals are constant in magnitude as the device rotates about the pivot pin, the angle between the device and the base is such that the device should rotate in the first plane.

BRIEF DESCRIPTION OF THE DRAWINGS

The present invention may be better understood, and its numerous objects, features and advantages made apparent to those skilled in the art by referencing the accompanying drawings. The use of the same reference number throughout the figures designates a like or similar element.

FIG. 7a is a perspective view of the system shown in FIG. 2 with several components removed to illustrate several exemplary components;

FIGS. 7b–7d are top views of the system shown in FIG. 7a;

FIG. 8b illustrates operational aspects of the actuator assembly shown in FIG. 8a;

FIGS. 9a and 9b show top and side views, respectively, of at frame of the actuator assembly shown in FIG. 8a;

FIG. 10b illustrates operational aspects of the upper focus stop shown in FIG. 10a;

FIG. 16c illustrates an exploded view of the base, motor and the tool of FIG. 16a;

Figure 1:
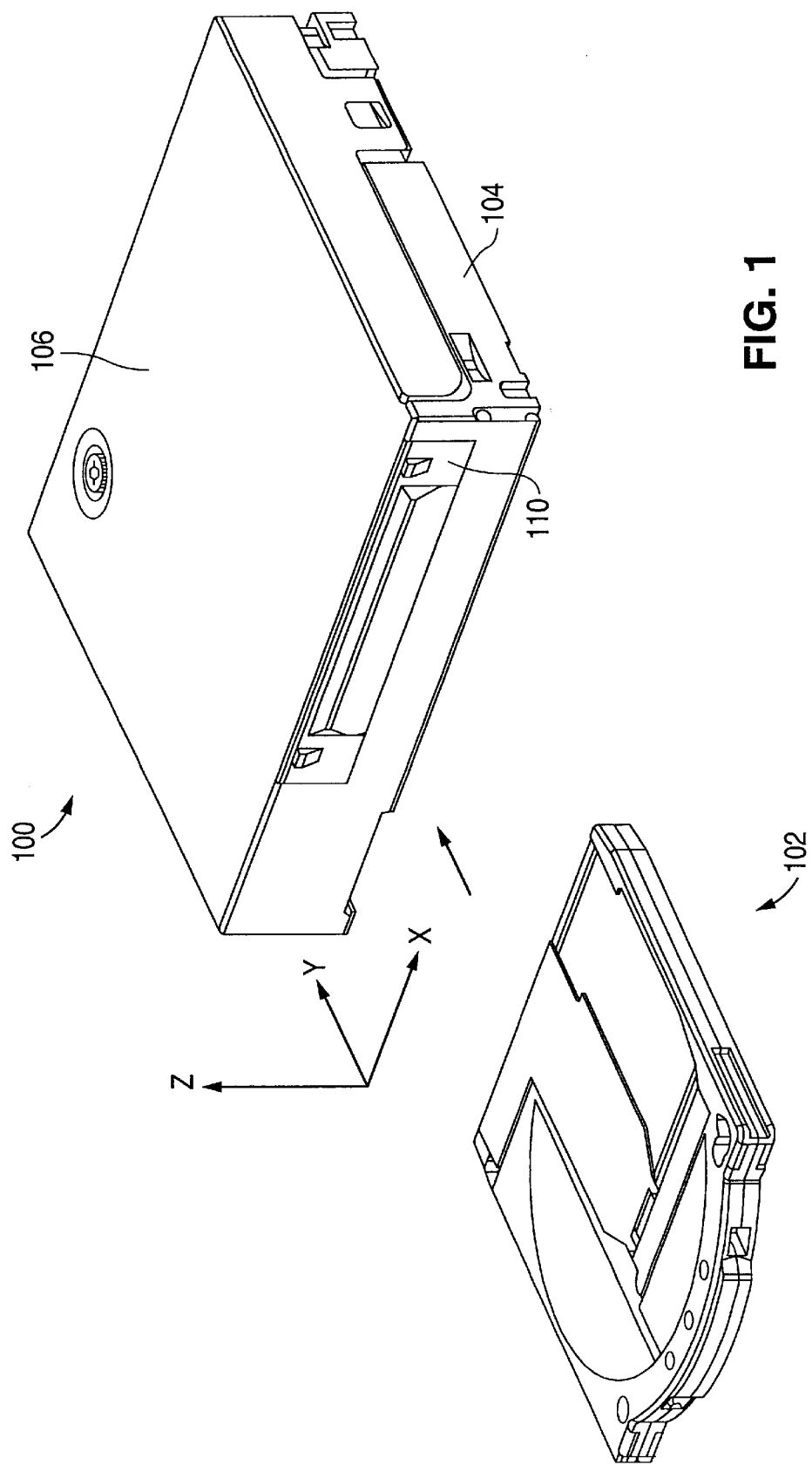
FIG. 1 is a perspective view of an exemplary data cartridge and an exemplary data storage/retrieval system employing the present invention.

While the invention is susceptible to various modifications and alternative forms, specific embodiments thereof are shown by way of example in the drawings and will herein be described in detail. However, the drawings and detailed description thereto are not intended to limit the invention to the particular form disclosed. On the contrary, the intention is to cover all modifications, equivalents, and alternatives falling within the spirit and scope of the present invention as defined by the appended claims.

DETAILED DESCRIPTION

FIG. 1 is a perspective view of an exemplary data storage/retrieval system 100 and an exemplary data cartridge 102. Data storage/retrieval systems are often referred to in the art as disk drives. This description will hereinafter refer to data storage/retrieval system 100 as "system 100." System 100 is configured to receive and read/write data to data cartridge 102.

System 100 includes a base 104 to which all other system 100 components are directly or indirectly connected or mounted, a cover 106, and a door 110 which, together, isolate delicate internal components from external contaminants. Door 110 is rotatable at its base between open and closed positions to allow manual loading or unloading of a data cartridge 102 into or out of system 100.

System 100 may take form in various sizes. In one embodiment, the height of system 100 measured in the z direction may be as small as 10 mm, the width of system 100 measured in the x direction may be as small as 50 mm, and the length of system 100 measured in the y direction may be as small as 45 mm. Smaller sizes of system 100 are limited only by the ability to manufacture smaller components thereof.

Figure 2:
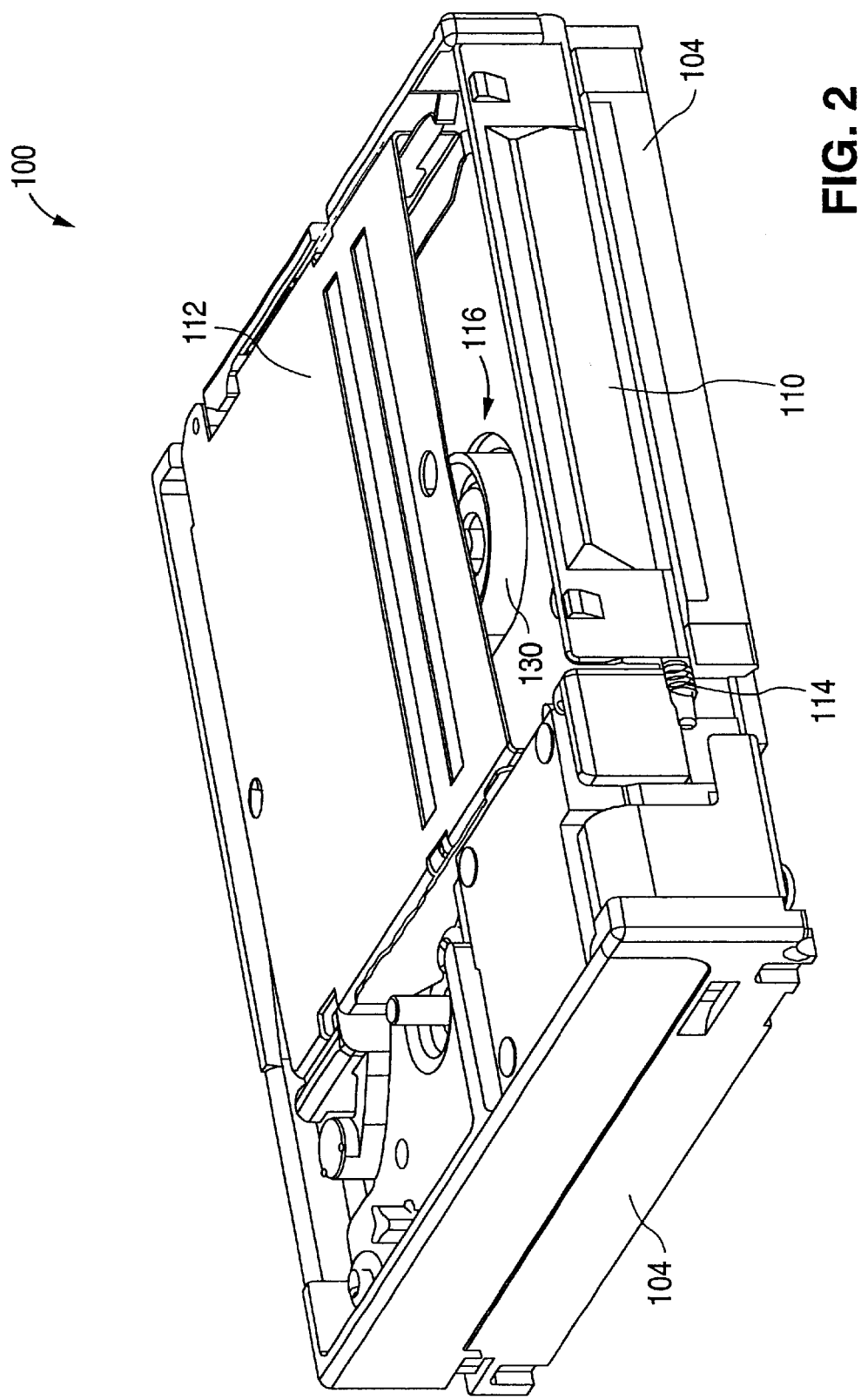
FIG. 2 is a perspective view of the system shown in FIG. 1 with its cover removed to expose several exemplary components.

FIG. 2 is a perspective view of the system 100 shown in FIG. 1 with cover 106 removed to expose several exemplary components. The figures of this detailed description use like reference numerals to designate like components. With reference to FIG. 2, exemplary internal components of system 100 include a tray 112 into which data cartridge 102 (not shown in FIG. 2) is received, a door spring 114 for biasing door 110 in the closed position, and a spindle motor 116 (partially shown).

Figure 3A:
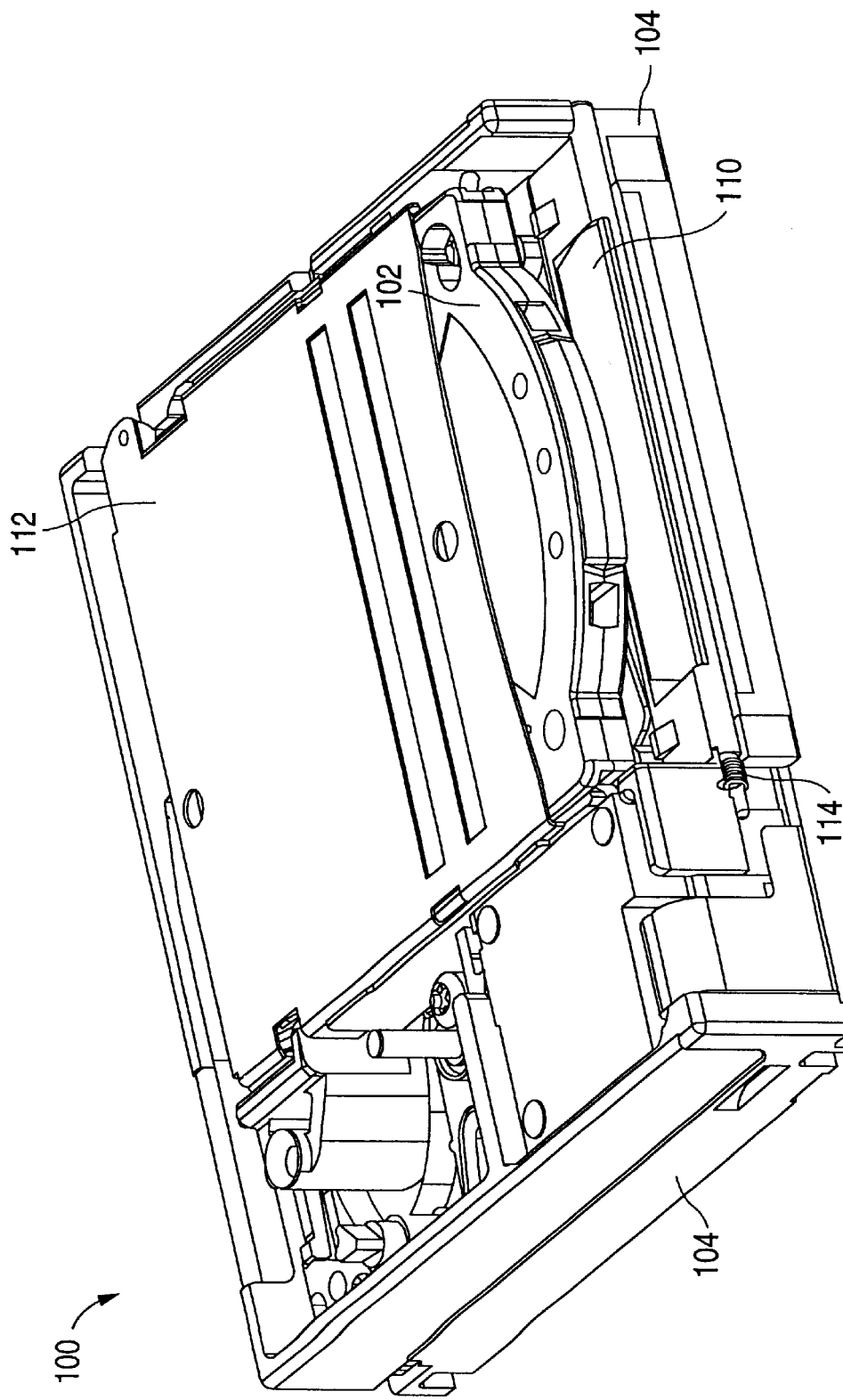
FIGS. 3a and 3b show perspective and top views, respectively, of the system of FIG. 2.
Figure 3B:
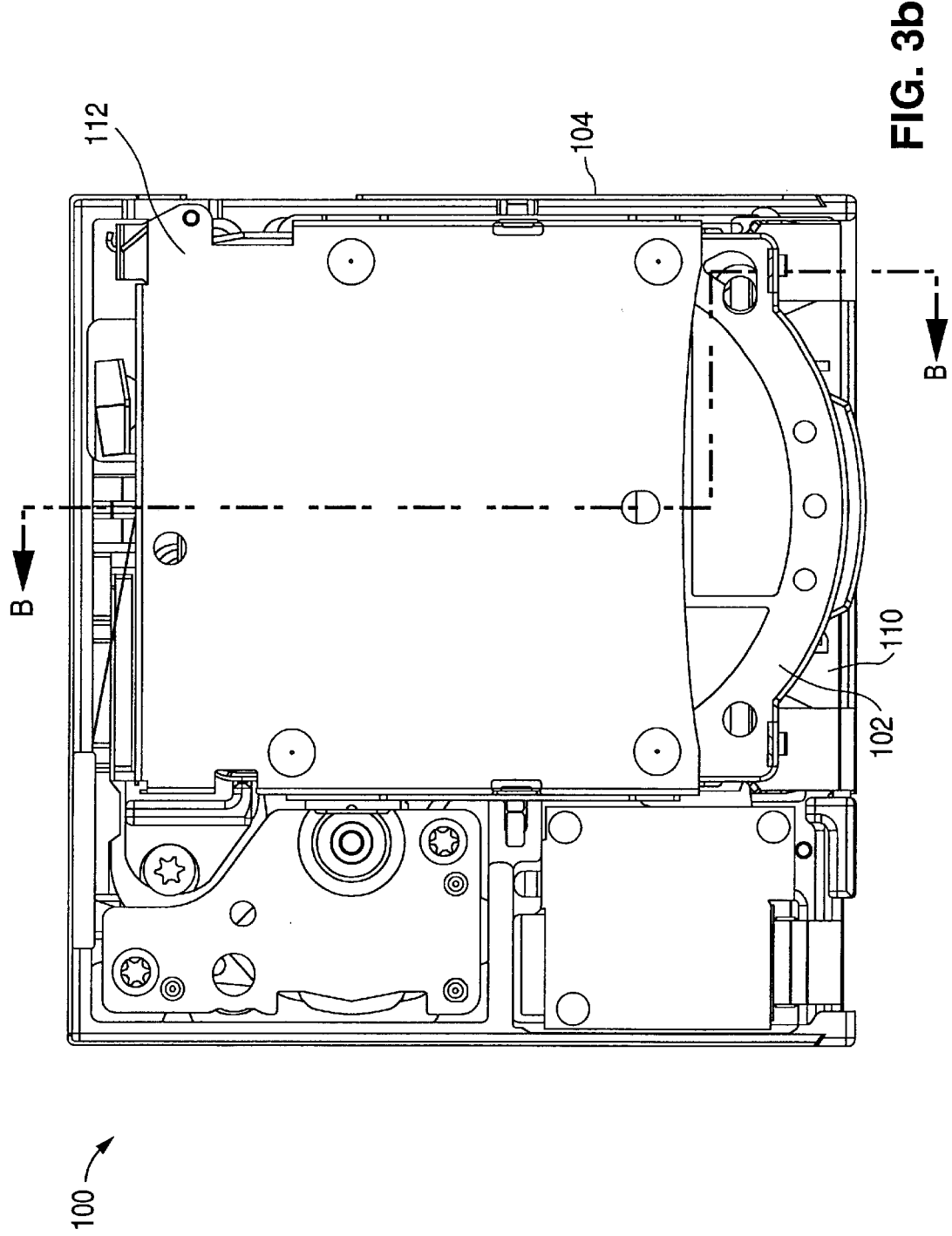
Figure 4:
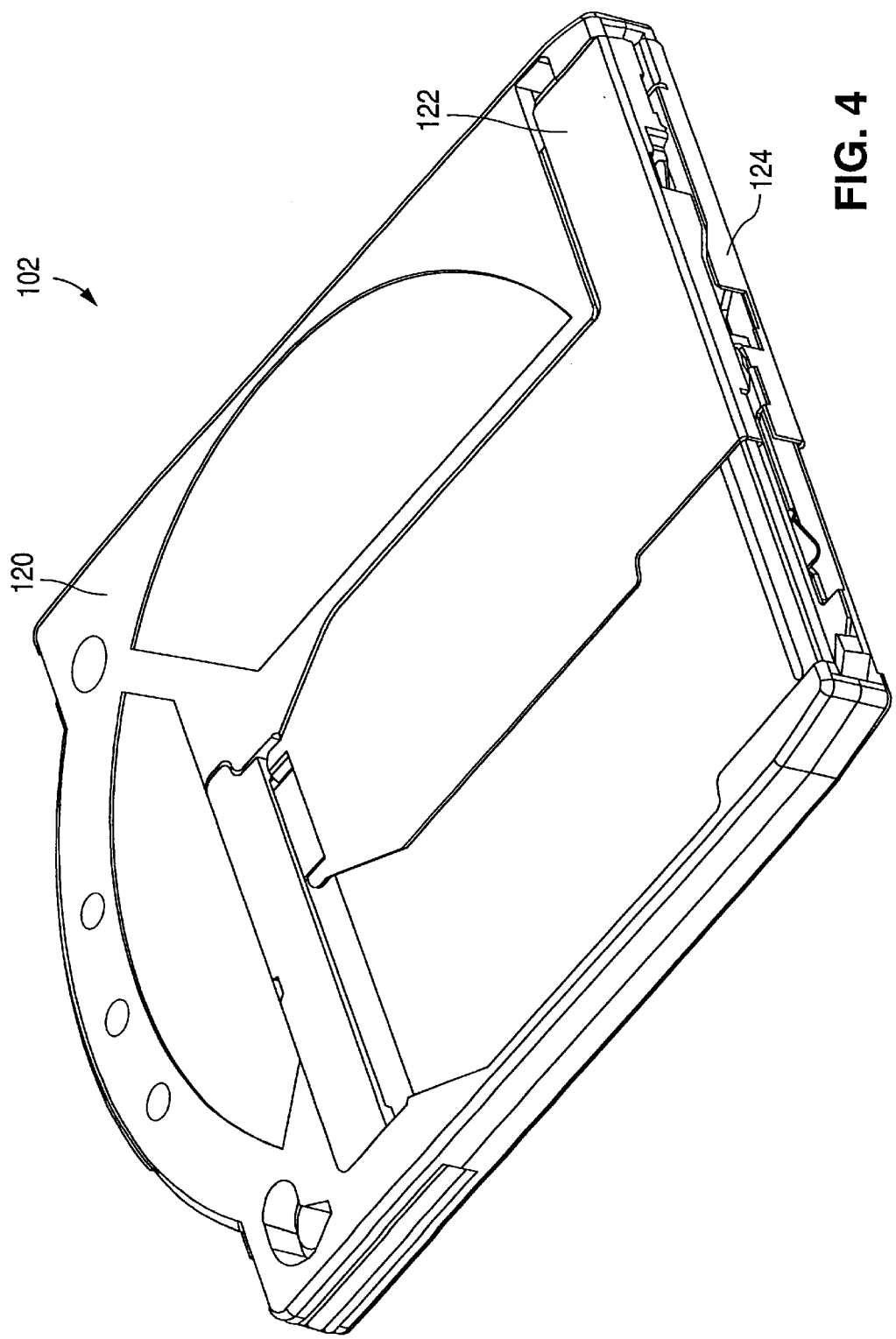
FIG. 4 is a perspective view of the cartridge shown in FIGS. 1 and 3.

FIGS. 3a and 3b show perspective and top views of the system 100 of FIG. 2 with data cartridge 102 received in tray 112. FIG. 4 is a perspective view of data cartridge 102 shown in FIGS. 1 and 3. Data cartridge 102 includes a cartridge shell 120, a top sliding shutter 122, and a bottom sliding shutter 124. The top and bottom sliding shutters 122 and 124 are capable of independently sliding between open and closed states. In FIG. 4, shutter 122 is shown closed.

Figure 5A:
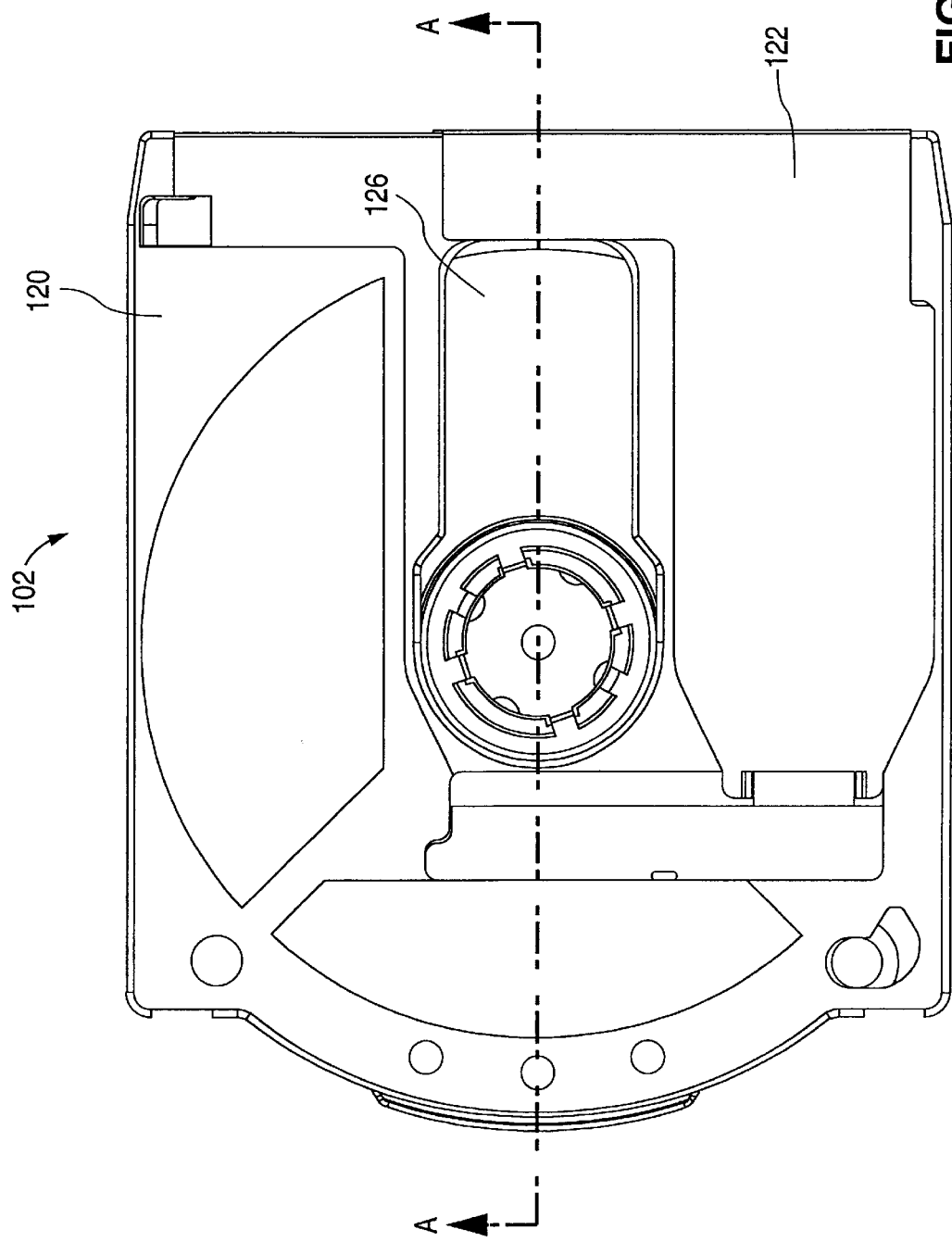
FIG. 5a is a top view of the cartridge shown in FIG. 4.

FIG. 5a is a top view of data cartridge 102 shown in FIG. 4 with shutter 122 in the opened state to expose data storage disk 126. With shutter 122 open, spindle motor 116 (FIG. 2) can rotate disk 126 while data is written thereto or read therefrom.

Figure 5B:
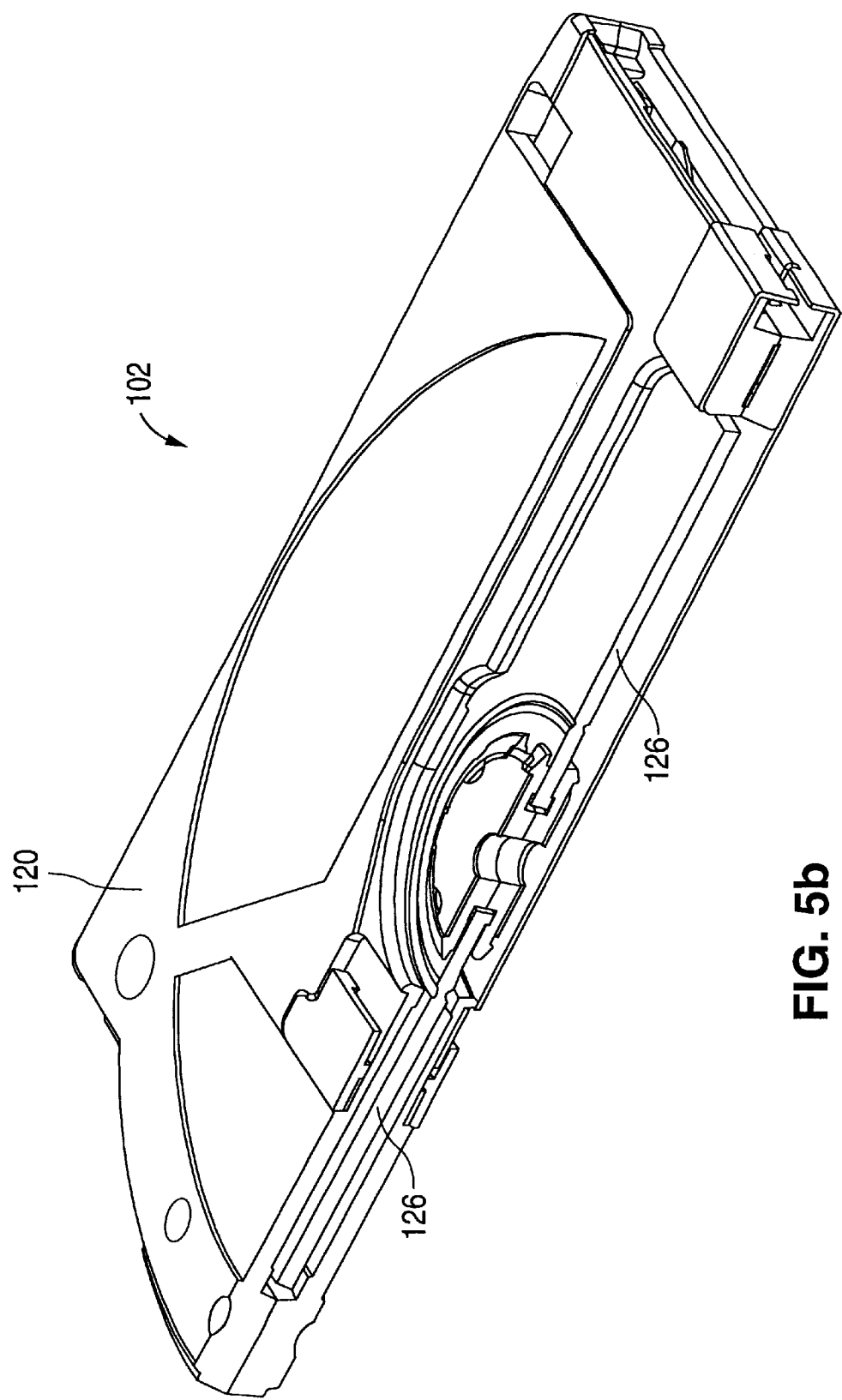
FIG. 5b is a cross-sectional view of the cartridge shown in FIG. 5a taken along line AA thereof.

FIG. 5b is a cross-sectional view of the data cartridge 102 shown in FIG. 5a taken along line AA thereof. As seen in FIG. 5b, data storage disk 126 is capable of free rotation within cartridge shell 120.

For purposes of explanation only, the present invention will be described with reference to system 100 that optically reads/writes data to the data storage disk 126 in data cartridge 102, it being understood that the present invention may find application in other types of data storage/retrieval systems including those that magnetically or electromagnetically read/write data to the disk in data cartridge 102. Data storage disk 126 in data cartridge 102 may take form in the optical data storage disk described in application Ser. No. 09/854,333 filed May 11, 2001, entitled Optical Data Storage With Enhanced Contrast.

Figure 6:
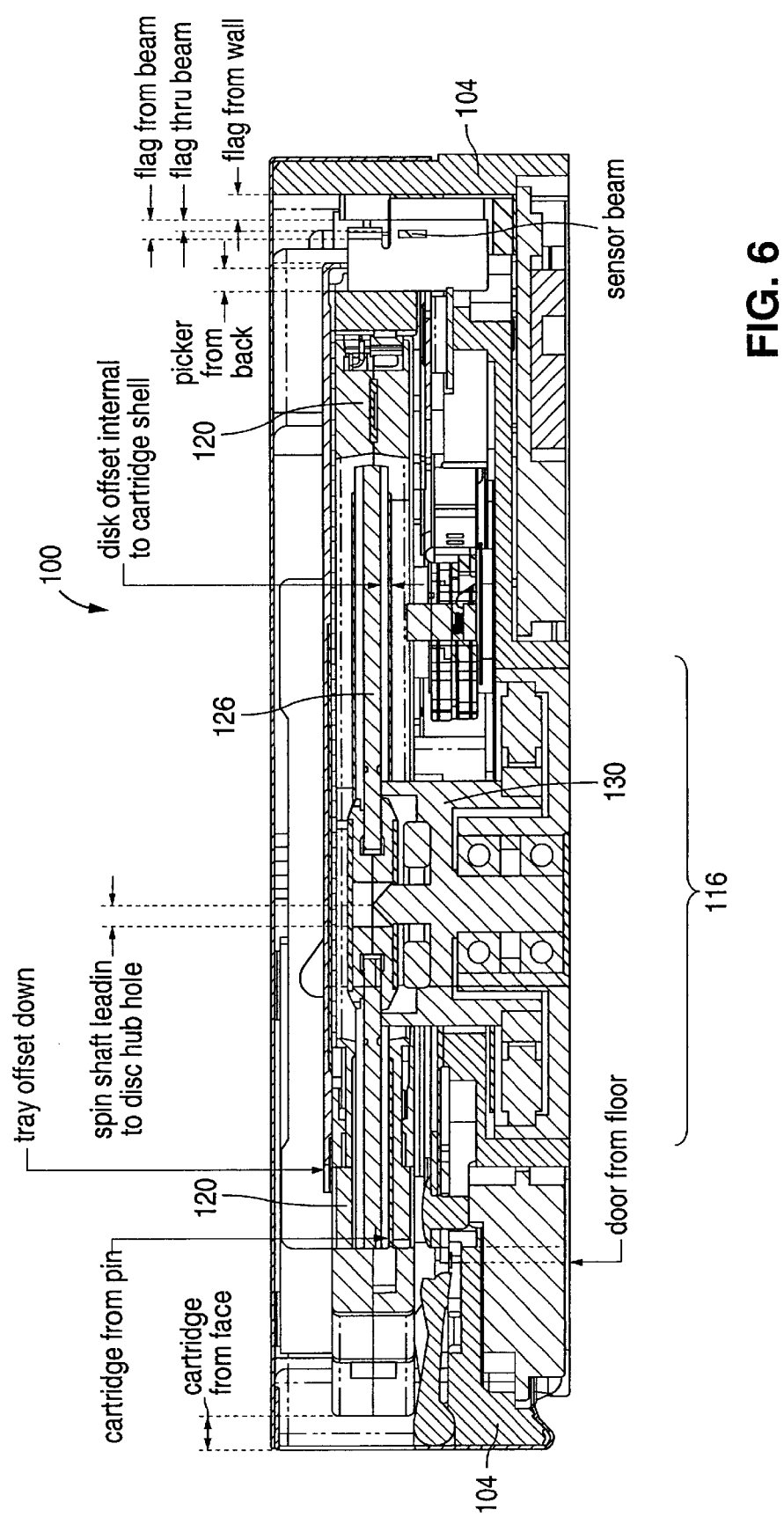
FIG. 6 is a cross-sectional view of the system of FIG. 3b taken along line BB thereof.

FIG. 6 is a cross-sectional view of the data system 100 of FIG. 3b taken along line BB thereof. In FIG. 6, data cartridge 102 is shown in a fully loaded position with data storage disk 126 engaging cylinder 130 of spindle motor 116. application Ser. No. 09/946,845 filed Sep. 4, 2001, entitled Cartridge Load/Eject Mechanism for Data Storage Disk System, and Provisional Application No. 60/265,830, filed Jan. 31, 2001, entitled Cartridge-Loading Mechanism For Data Storage Disk, illustrate operational aspects of loading data cartridge 102 into system 100. In this position, cylinder 130 can rotate data storage disk 126 freely within cartridge shell 120 while data is written to or read from data storage disk 126. Disk 126 includes on its surfaces a plurality of circular, concentric data tracks or a single spiral data track which data may be written to or read from via a light beam (not shown in FIG. 6) incident thereon. Hereinafter, unless indicated otherwise, disk 126 will be described as having a plurality of circular, concentric data tracks, it being understood that disk 126 should not be limited thereto.

Figure 7B:
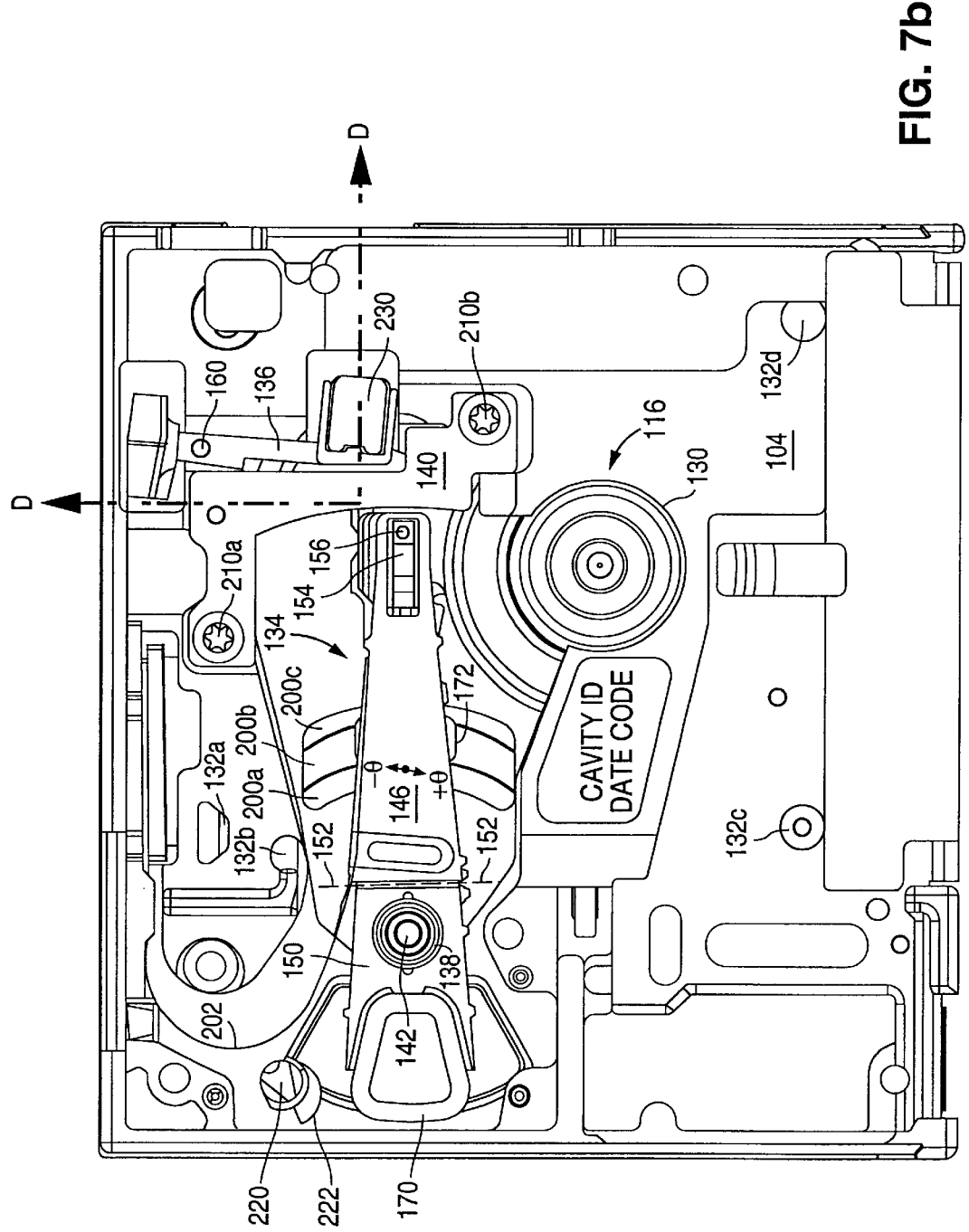
Figure 7C:
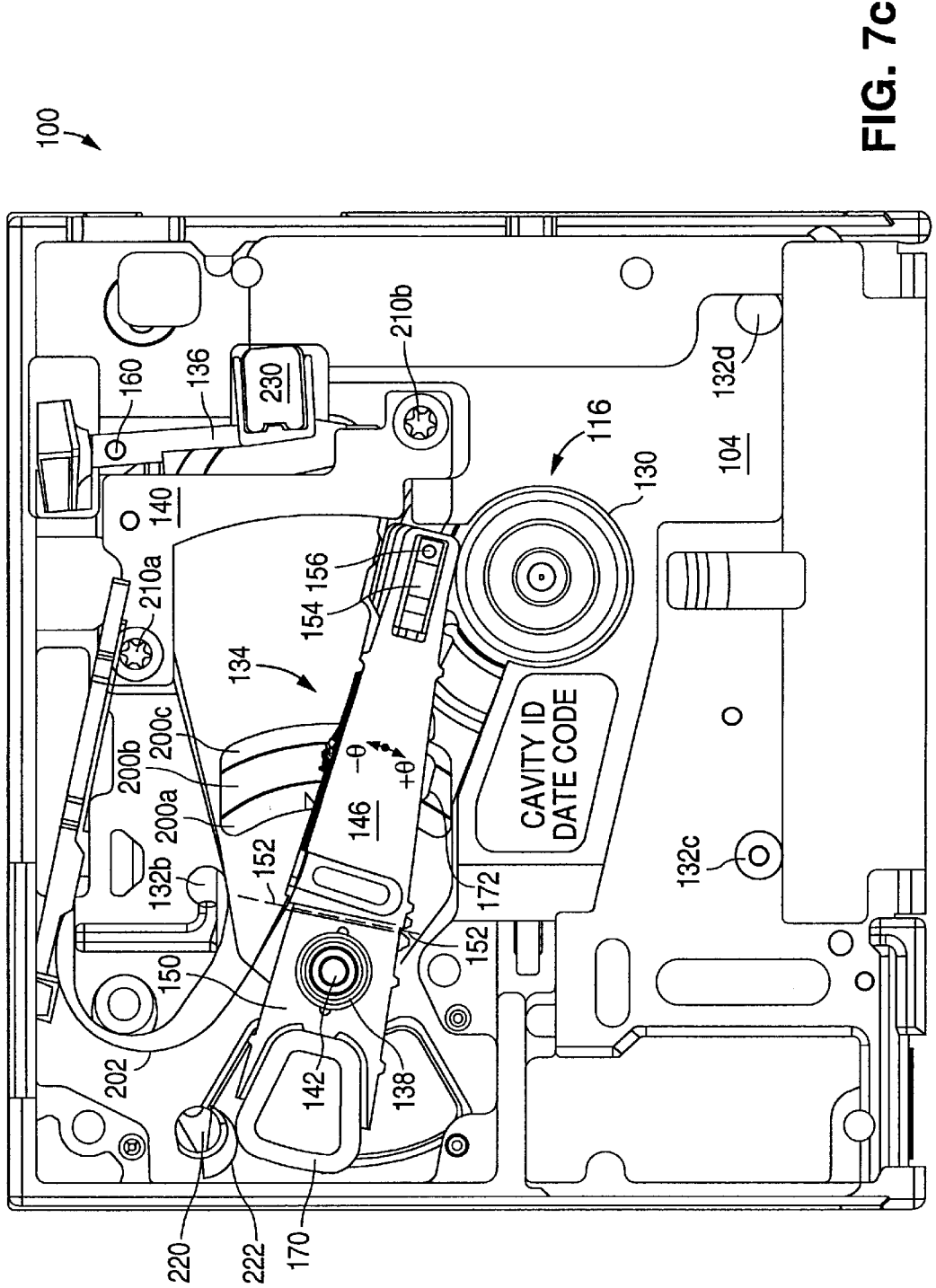
Figure 7D:
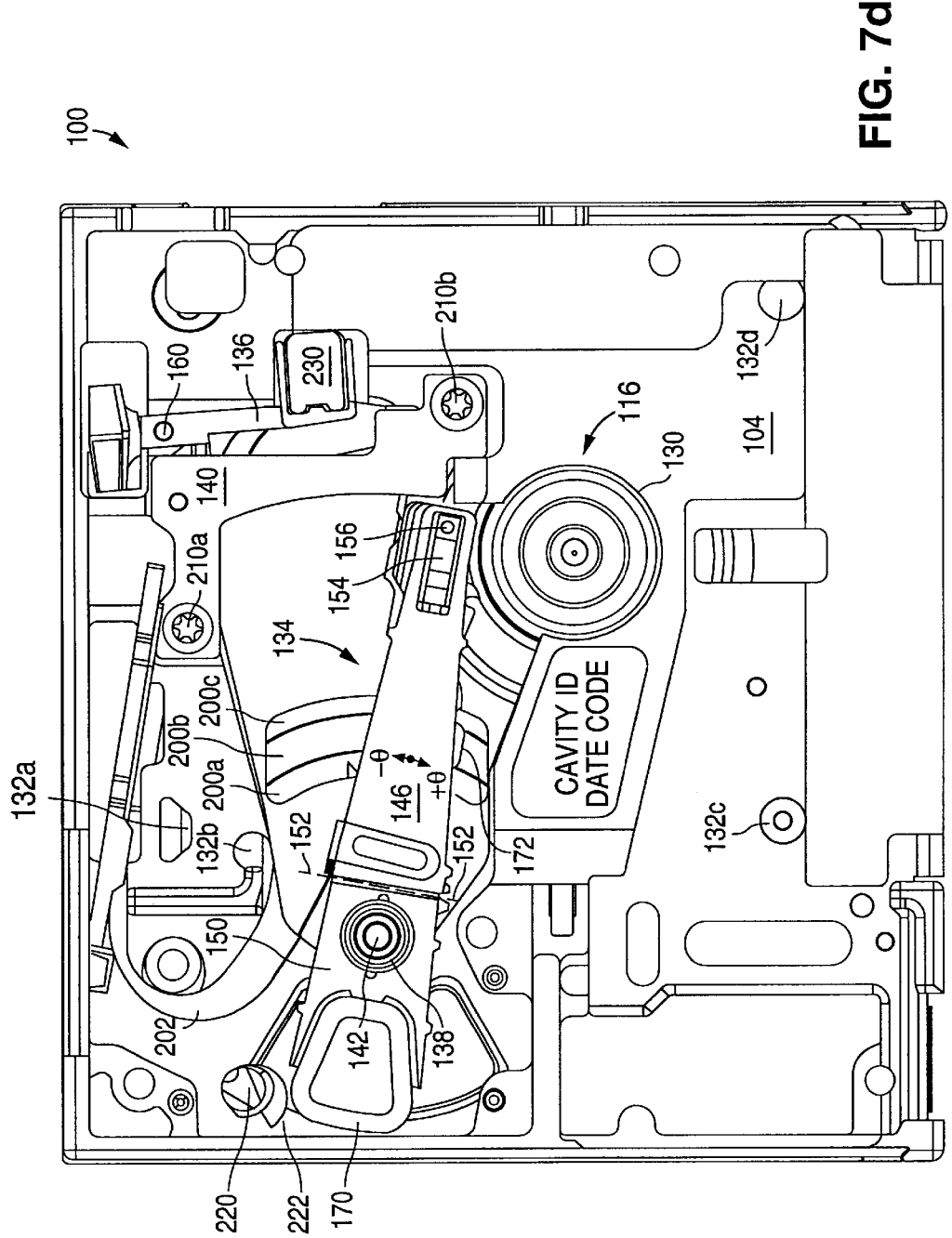

FIG. 7a is a perspective view of system 100 shown in FIG. 2 with several components, such as tray 112, removed. FIGS. 7b–7d are top views of system 100 shown in FIG. 7a. FIGS. 7a–7d illustrate several components of system 100. More particularly, FIGS. 7a and 7b illustrate exemplary embodiments of spindle motor 116, z-datums 132a–132d, actuator assembly 134, parking arm 136, and upper focus stop 140. Although data cartridge 102 is not shown in FIGS. 7a and 7b, spindle motor 116, z-datums 132a–132d, actuator assembly 134, parking arm 136, and upper focus stop 140 are normally positioned beneath data storage disk 126 of data cartridge 102 when data cartridge 102 is fully loaded in system 100.

With continued reference to FIGS. 7a and 7b, actuator assembly 134 is one embodiment of a device for reading or writing data to data storage disk 126. Actuator assembly 134 is rotatably mounted to base 104 via bearing assembly 138 and actuator assembly pivot pin 142. As will be more fully described below, a rotation motor is provided to rotate actuator assembly 134 about actuator assembly pivot pin 142 in the positive or negative θ directions. Actuator assembly 134 includes a frame 144 (FIGS. 9a and 9b) which in turn includes a focus arm 146 rotatably connected to a tracking arm 150. As will be more fully described below, a focus motor is provided to rotate focus arm 146 about axis 152 in the positive or negative β directions. It is noted that positive and negative β directions are perpendicular to sheet on which FIG. 7b is drawn.

Actuator assembly 134 further includes a head assembly or optical pick-up unit (OPU) 154 mounted to focus arm 146. OPU 154 performs a variety of functions one of which is to illuminate data storage disk 126 with a focused beam of light for reading or writing data. The focus motor functions to rotate focus arm 146 about rotational axis line 152 to bring a lens 156 of OPU 154 into focus with a surface (not shown in FIGS. 7a and 7b) of data storage disk 126. The figures and detailed description illustrate a system 100 having one actuator assembly 134. System 100 may include a second actuator assembly, possibly mounted to a second base, such that disk 126 is positioned between two actuator assemblies. In this embodiment, shutters 122 and 124 (FIGS. 4 and 5b) may be simultaneously open when cartridge 102 is loaded so that the two actuator assemblies can simultaneously read or write data.

Parking arm 136 is one embodiment of a device for selectively inhibiting movement of actuator assembly 134. Parking arm 136 is rotatably mounted to base 104 via parking pivot pin 160. Parking arm 136 is rotatable about pin 160 between parked and unparked positions. FIGS. 7a and 7b show parking arm 136 in the parked position. As will be more fully explained below, when parking arm 136 is in the parked position, it "parks" or engages actuator assembly 134 to inhibit further movement thereof. FIG. 7c shows parking arm 136 in the unparked position. With parking arm 136 in the unparked position, actuator assembly 134 is "unparked" or free to move. Parking arm 136 is capable of parking actuator assembly 134 at any position in its range of rotation about actuator assembly pivot pin 142.

Upper focus stop 140 is one embodiment of a device for limiting movement of actuator assembly 134 in the positive β direction. Upper focus stop 140 is fixedly mounted to base 104. As noted above, focus arm 146 (and thus OPU 154) rotates in the positive or negative β directions about axis line 152 to bring lens 156 into focus with the surface of data storage disk 126. However, rotation of focus arm 146 should be limited to prevent contact between lens 156 and data storage disk 126. As will be more fully described below, upper focus stop 140 operates to prevent contact between lens 156 and data storage disk 126. Upper focus stop 140 is capable of limiting positive β rotation of focus arm 146 of actuator assembly 134 at any position in actuator assembly's range of rotation about actuator assembly pivot pin 142.

With continued reference to FIGS. 7a and 7b, FIGS. 8a and 8b show perspective and front views, respectively, of actuator assembly 134. Actuator assembly 134 includes OPU 154, frame 144, actuator assembly pivot pin 142, a tracking wire coil 170, and a focus wire coil 172. Coils 170 and 172 are components of separate electromagnets. As noted above, actuator assembly 134 is rotatably mounted on base 104 via actuator assembly pivot pin 142, and frame 144 includes focus arm 146 rotatably attached to tracking arm 150. In one embodiment, focus arm 146 is rotatably connected to tracking arm 150 via flex plate 174. Alternative embodiments for rotatably connecting focus arm 146 to tracking arm 150 are contemplated.

With continued reference to FIGS. 8a and 8b, FIGS. 9a and 9b show top and side views, respectively, of frame 144. In one embodiment, focus arm 146 is formed from carbon fiber layers 176a–176e connected together using an adhesive. Similarly, tracking arm 150, in one embodiment, is formed from carbon fiber layers 180a–180e connected together using an adhesive. When aligned and adhered together, carbon fiber layers 180a–180e form an aperture 182 for receiving actuator assembly pivot pin 142 (not shown in FIGS. 9a and 9b). Further, when aligned and adhered together, carbon fiber layers 180a–180e form a pair of tracking coil arms 184a and 184b that receive tracking coil 170. Carbon fiber layers 176a–176e when aligned and adhered together form a recess 186 for receiving the OPU 154. In on e embodiment, each of the carbon fiber layers 176a and 176b includes an extension 190a and 190b, respectively. As will be more fully described below, extension 190b interacts with upper focus stop 140 to limit rotation of focus arm 146 in the positive β direction, and extension 190a interacts with a surface on base 104 to limit rotation of focus arm 146 in the negative β direction. Further, as will be described below, when parking arm 136 "parks" actuator assembly 134, extension 190b interacts with the parking arm 136 while extension 190a interacts with the surface on base 104.

Frame 144 should not be limited to that shown in the figures of this detailed description; alternative assemblies are contemplated. For example, frame 144 may take form in an integrally formed focus arm 146 rotatably connected to an integrally formed tracking arm 150. Moreover, extension 190a or 190b could be separately formed and attached to focus arm 146 rather than integrally formed with carbon fiber layers 176a and 176b, respectively.

Figure 9A:
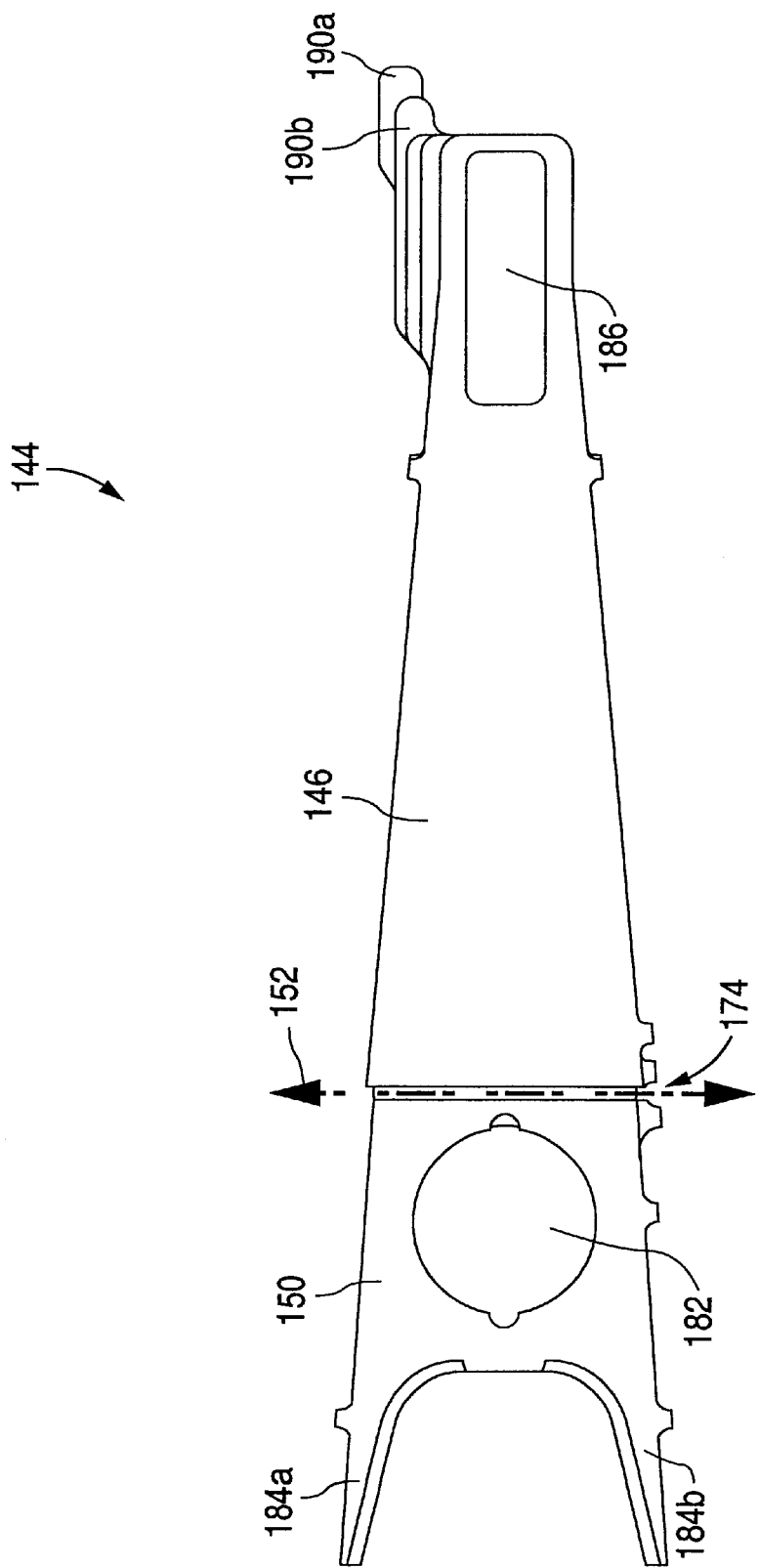
Figure 9B:
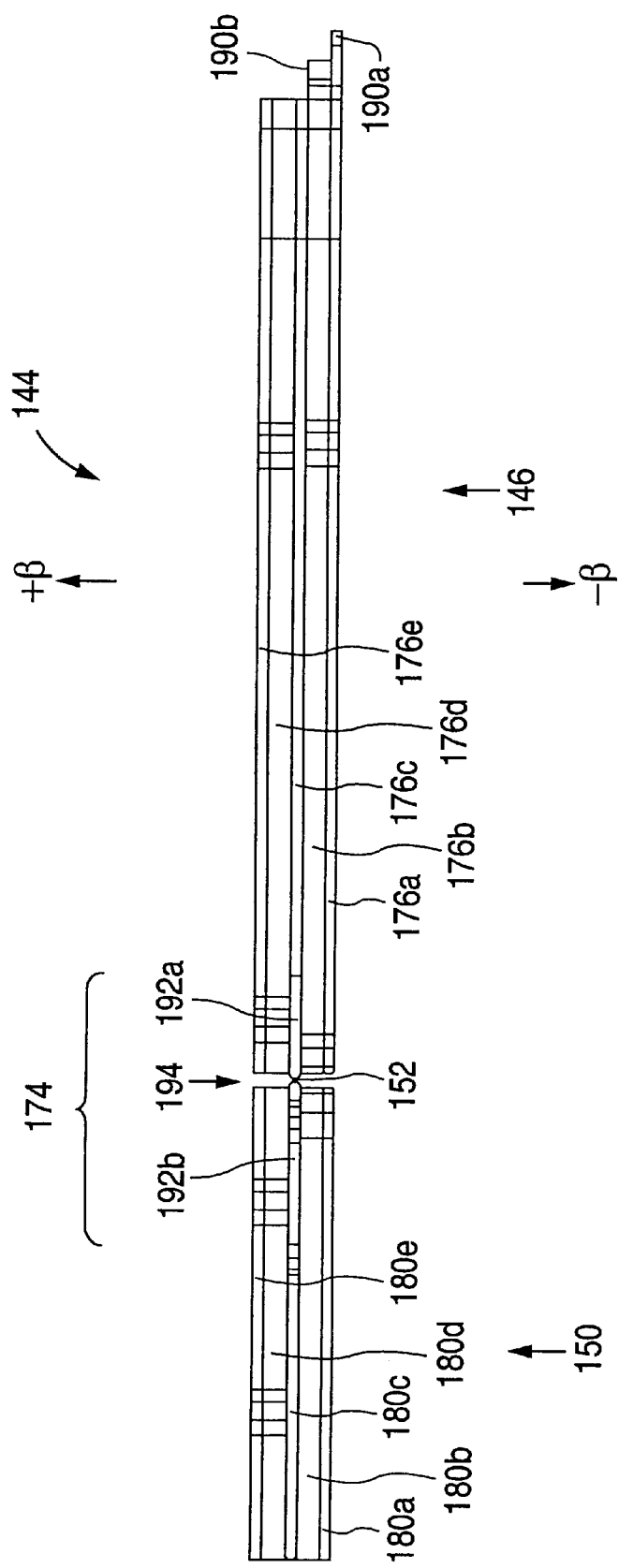

With continued reference to FIGS. 9a and 9b, focus arm 146 is rotatably connected to tracking arm 150 via flex plate 174. In one embodiment, flex plate 174 is formed from a sheet of metal such as stainless steel. This sheet of metal may be crimped to form front and back portions 192a and 192b, respectively, rotatably connected together via a crimped portion 194. Front portion 192a and back portion 192b are connected to focus arm 146 and tracking arm 150, respectively. Flex plate 174 functions like a hinge. Flex plate 174 allows front and back portions 192a and 192b, and thus focus arm 146, to rotate about axis 152. The narrowest portion of crimped portion 194 defines axis line 152 about which focus arm 146 rotates. In one embodiment, front portion 192a is fixedly attached between carbon fiber layers 176b and 176d using an adhesive, and back portion 192b is fixedly attached between carbon fiber layers 180b and 180d using an adhesive.

Figure 8A:
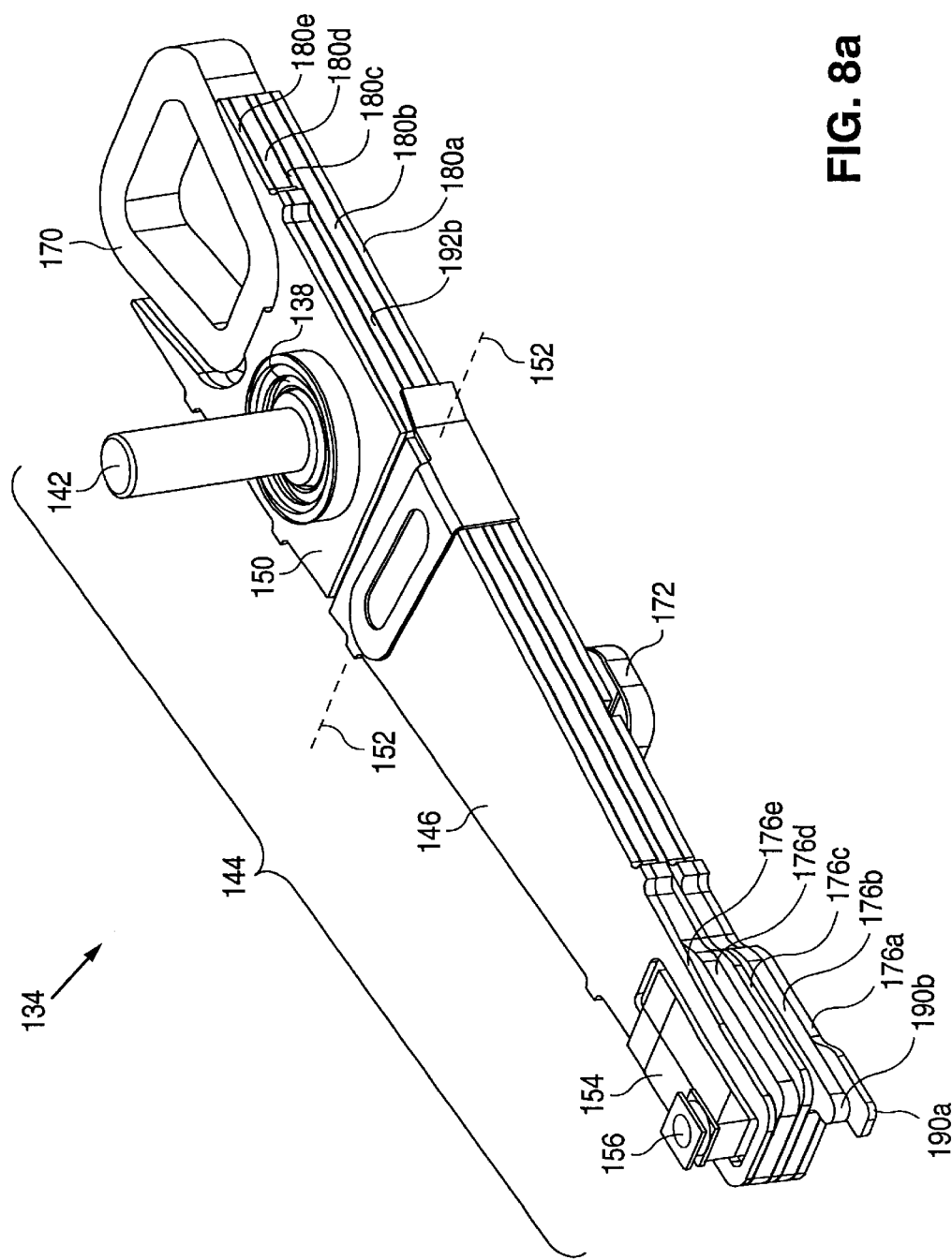
FIG. 8a is a perspective view of an actuator assembly shown in FIGS. 7a–7d.
Figure 8B:
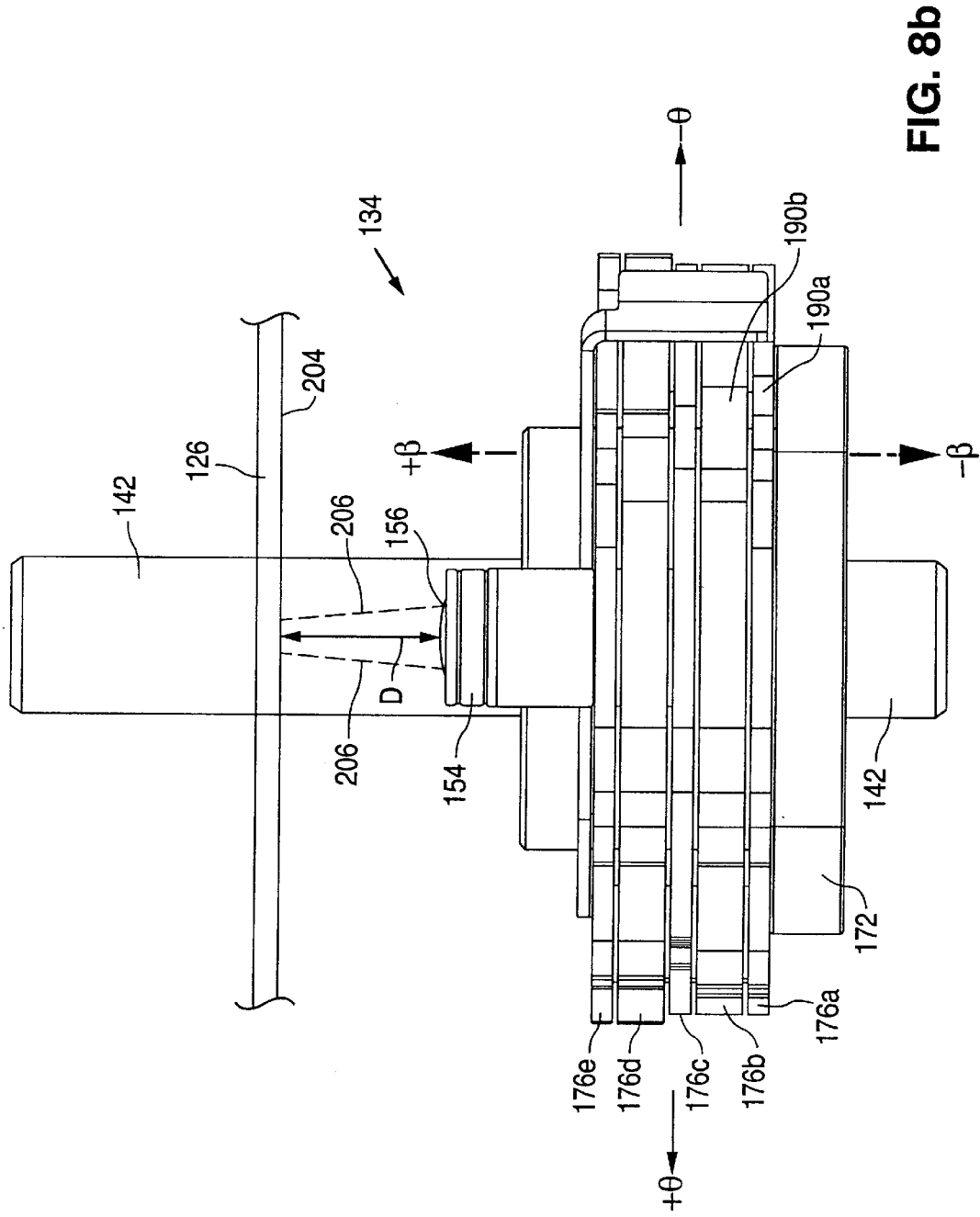

With continued reference to FIGS. 7a, 7b, 8a, and 8b, the mechanical force for rotating focus arm 146 about axis line 152 is provided by the focus motor mentioned above. application Ser. No. 09/947,111 filed Sep. 4, 2001, entitled Fringing Field Focus Motor And Mechanism for Optical Disk Drive describes one embodiment of a focus motor. In the embodiment shown, the focus motor includes focus coil 172 mounted to actuator assembly 134 and an array of permanent focus magnets 200a–200c attached to base 104. A variably controlled electrical current is provided to focus coil 172 via flex circuit 202 (FIGS. 7a and 7b). The variably controlled electrical current is provided to flex circuit 202 by system electronics (not shown) mounted on a printed circuit board (PCB) which, in turn, is attached to the underside of base 104. The variably controlled current flowing through focus coil 172 creates a variably controlled magnetic field that interacts with the permanent magnetic field created by the array of permanent focus magnets 200a–200c (FIGS. 7a and 7b). The interaction of these magnetic fields causes focus arm 146 to controllably rotate about axis line 152 in the positive or negative β direction depending on the polarity and/or magnitude of the current provided to focus coil 172. Through the interaction of the permanent and variably controlled magnetic fields, the distance D (FIG. 8b) between OPU 154 and the data storage disk 126 positioned above OPU 154, can be adjusted to bring lens 156 of OPU 154 into focus with surface 204 of data storage disk 126. With reference to FIGS. 8a and 8b, OPU 154 includes a lens 156, a light generation device (not shown) and one or more light detectors (not shown). One embodiment of OPU 154 is described in application Ser. No. 09/846,042, filed May 1, 2001, entitled Optical Pickup Unit Assembly Process. The light generation device may take form in a light emitting diode that generates a light beam 206 (FIG. 8b) for reading or writing data to data storage disk 126 as data storage disk 126 is rotated by spindle motor 116 (not shown in FIGS. 8a and 8b). When writing data to data storage disk 126, the intensity of light beam 206 is modulated by the light generation device in accordance with data to be written. When reading data from data storage disk 126, the intensity of light beam 206 is substantially constant.

The one or more light detectors detect light reflected from data storage disk 126 and generate corresponding electrical signals in response thereto. The magnitude of the electrical signals generated by the one or more detectors is generally proportional to the intensity of light reflected from data storage disk 126. With reference to FIG. 8b, lens 156 focuses the light beam 206 onto data storage disk 126. Light reflected by the data storage disk 126 also passes through lens 156 before being detected by the one or more light detectors of OPU 154.

FIG. 8b shows that lens 156 is separated from disk surface 204 by distance D. Ideally D should substantially equal focal length L of lens 156. With D substantially equal to L, lens 156 is in focus with surface 204 and OPU 154 can properly read or write data to data storage disk 126. Due to dynamic factors such as physical irregularities in surface 204 (the physical irregularities are dynamic in the sense that they cause the surface 204, as seen by lens 156, to deviate while data storage disk 126 rotates), improper angular alignment between actuator assembly pivot pin 142 and base 104 more fully described below, or unexpected mechanical forces applied to either actuator assembly 134 or data storage disk 126, D may vary from L and take lens 156 out of focus with surface 204. Fortunately, if D varies from L, the variances can be detected in signals generated by the one or more detectors of OPU 154.

Signals generated by the one or more detectors of OPU 154 are transmitted to system electronics attached to the PCB via flex circuit 202 (FIGS. 7a and 7b) where they are monitored, for example, during data read/write operations. The magnitude of these signals will increase or decrease as D varies with respect to L. The system electronics compare the generated signals with a predetermined signal S. The magnitude of S is calculated as a function of L. If the generated signals compare equally or substantially equal to S, then distance D should equal or substantially equal L, and lens 156 is in focus or substantially in focus with surface 204. If the magnitude of the generated signals is greater or less than S, then lens 156 is substantially out of focus with surface 204. In the latter situation, the system electronics can adjust the magnitude and/or polarity of current provided to focus coil 172, which in turn causes the focus arm 146, and thus lens 156 of OPU 154, to rotate about axis 152 until the magnitude of the generated signals equals or substantially equals S. With the magnitude of the generated signals equal to S, lens 156 should again be in focus with surface 204.

Actuator assembly 134 is rotatably mounted to base 104 via actuator assembly pivot pin 142 (FIGS. 7a, 7b, and 8b). Ideally, pivot pin 142 should be mounted to base 104 with an angle therebetween that aligns actuator assembly 134 to disk 126. Actuator assembly 134 is aligned to disk 126 when a constant distance separates tracking arm 150 and disk 126 as actuator assembly 134 rotates about pin 142. Actuator assembly 134 is also said to be aligned to disk 126 when a constant distance separates focus arm 146 and disk 126 as actuator assembly 134 rotates about pin 142. Thus, if the distance D between lens 156 and data storage disk 126 is constant or substantially constant (e.g., distance D is equal to or substantially equal to L, the focal length of lens 156) as actuator assembly 134 rotates through its full range of motion about pin 142, then actuator assembly 134 is properly aligned with disk 126. This latter definition of actuator assembly 134 to disk 126 alignment assumes that the angular position of focus arm 146 relative to tracking arm 150 remains constant while actuator assembly 134 rotates. It is noted that with no current or a constant current provided to focus coil 172, the angular position of focus arm 146 relative to tracking arm 150 should remain constant during rotational movement of actuator assembly 134 about pivot pin 142.

If the angular position of pivot pin 142 relative to base 104 is improper, actuator assembly 134 and disk 126 will be misaligned and, assuming no relative motion between focus arm 146 and tracking arm 150, the distance D between lens 156 and data storage disk 126 will vary as actuator assembly 134 rotates about pin 142. System 100 can properly operate notwithstanding misalignment of actuator assembly 134 and disk 126. More particularly, when distance D varies from L, as noted above, the system electronics can adjust the magnitude and/or polarity of current provided to focus coil 172, which in turn causes the focus arm 146 to rotate about axis 152 until distance D equals L. In this fashion, a misalignment between actuator assembly 134 and disk 126 can be corrected. However, this correction requires power consumption by focus coil 172. Power consumption by system 100 is sought to be limited particularly when a battery provides the power.

Before pivot pin 142 is fixedly mounted to base 104, the angular position of pivot pin 142 relative to base 104 can be checked. For example, with data cartridge 102 loaded and cylinder 130 engaging data storage disk 126, current to focus coil 172 can be externally monitored as actuator assembly 134 travels through its full range of motion in the positive and negative θ directions. If an improper angular position exists between pivot pin 142 and base 104, current to focus coil 172 will vary in essentially a linear manner as actuator assembly 134 travels through its full range of motion. In the latter situation, the angular position between pivot pin 142 and base 104 can be adjusted until the monitored current provided to focus coil is constant as actuator assembly 134 travels through its full range of motion.

Ideally, for power conversation reasons, focus coil 172 should draw no current as actuator assembly 134 travels through its full range of motion. If a non-zero constant current is provided to focus coil 172 as actuator assembly 134 travels through its full range of motion, the distance measured in the z-direction between the actuator and base 104 can be adjusted accordingly. For example, actuator assembly 134 can be moved up or down on pivot pin 142 until no current is provided to focus coil 172. Alternatively, the angle between pivot pin 142 and base 104 can be further adjusted until no current is provided to focus coil 172. This latter angular adjustment should occur in a direction which is orthogonal to the angular adjustment direction which resulted in a constant current provided to focus coil 172 as actuator assembly travels through is full range of motion in the θ direction.

The angular position between pivot pin 142 and base 104 may also be checked by monitoring the signals generated by OPU 154 as actuator assembly 134 travels through its full range of motion. This method presumes that the focus motor is turned off (i.e., no current or a constant current is provided to focus coil 172). For example, with data cartridge 102 loaded and cylinder 130 engaging data storage disk 126, OPU 154 generates signals in response to receiving light reflected from data storage disk 126 as actuator assembly 134 rotates through its full range of motion. If a proper angular position exists between pivot pin 142 and base 104, then the magnitude of the signals generated by OPU 154 will be constant as actuator assembly 134 travels through its full range of motion. If, however, an improper angular position exists between pivot pin 142 and base 104, the magnitude of the generated signals will vary approximately linearly as actuator assembly 134 travels through its full range of motion. In the latter situation, the angular position of pivot pin 142 relative to base 104 can be adjusted until the magnitude of the generated signals is constant as actuator assembly 134 travels through its full range of motion. With a proper angle between base 104 and pivot pin 142, actuator assembly 134 will be properly aligned with data storage disk 126, and pivot pin 142 can be fixedly attached to base 104. In one embodiment, the pivot pin 142 can be fixedly attached to base 104 by adhesive bonding with an ultraviolet (UV) light sensitive adhesive such as EMCAST 612.

Figure 10A:
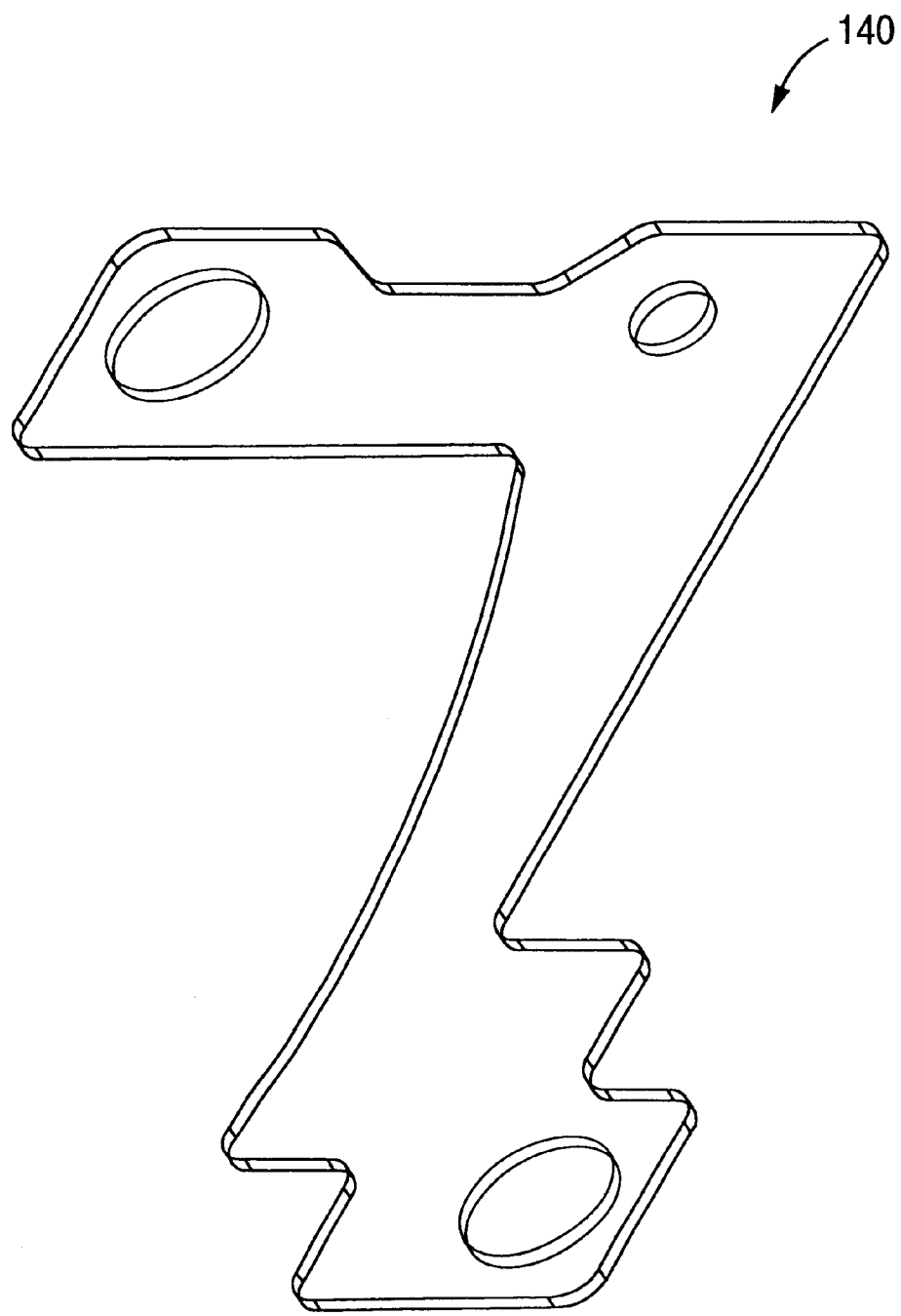
FIG. 10a illustrates a perspective view of the upper focus stop shown in FIGS. 7a–7d.

Focus coil 172 functions to rotate focus arm 146 and keep lens 156 in focus with data storage disk 126. However, rotation of focus arm 146 and thus lens 156 must be limited to prevent contact between lens 156 and data storage disk 126. If contact occurs between lens 156 and data storage disk 126 while data storage disk 126 is rotating, damage may result. Upper focus stop 140 functions to prevent contact between lens 156 and data storage disk 126. With continued reference to FIGS. 7a and 7b, FIG. 10a illustrates a perspective view of one embodiment of upper focus stop 140 having oppositely facing top and bottom surfaces. Upper focus stop 140 constitutes a rigid plate fixedly mounted to base 104 via fasteners 210a and 210b.

Figure 10B:
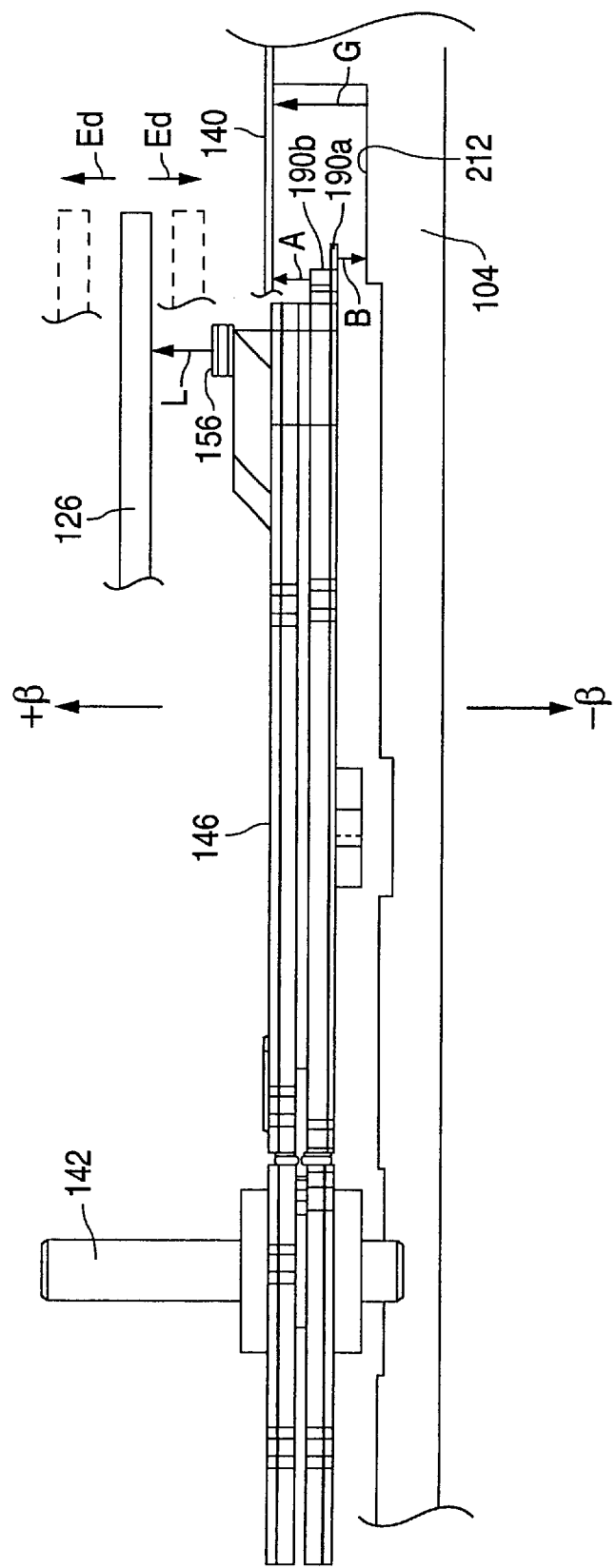

With upper focus stop 140 mounted to base 104, a gap is created between upper focus stop 140 and surface (lower focus stop) 212 of base 104 that allows limited rotation of focus arm 146 in the positive or negative β directions. FIG. 10b illustrates a side view of actuator assembly 134 with extensions 190a and 190b positioned in gap G between upper focus stop 140 and base 104. Upper focus stop 140 is positioned to limit the rotation of focus arm 146 in the positive β direction. More particularly, before lens 156 can contact data storage disk 126, extension 190b of focus arm 146 engages the bottom surface of upper focus stop 140. Once extension 190b and upper focus stop 140 engage each other, focus arm 146, and thus lens 156, can no longer rotate in the positive β direction. Lower focus stop 212 is defined as a surface of base 104 that limits the negative rotation of focus arm 146. Once extension 190a and lower focus stop 212 engage each other, focus arm 146 can no longer rotate in the negative β direction.

With no forces applied to actuator assembly 134, distance A (FIG. 10b) separates extension 190b from upper focus stop 140 and distance B separates extension 190a from lower focus stop 212. As mentioned above, dynamic factors such as mechanical forces or surface irregularities in data storage disk 126 may cause the surface of data storage disk 126 to fluctuate in the positive or negative β direction. For example, an unexpected mechanical force applied to data storage disk 126 may cause data storage disk 126 to move from its normal direction shown in FIG. 10b in the positive or negative β directions by an error distance Ed. To ensure that enough space is available for focus arm 146 to rotate and bring lens 156 in focus with data storage disk 126 when data storage disk 126 is subjected to dynamic factors, actuator assembly 134 should be mounted to base 104 and/or gap G should take into account Ed. In one embodiment, actuator assembly 134 should be mounted and/or gap G should be formed so that:

$$A > Ed, \text{ and} \tag{1}$$

$$B > Ed \tag{2}$$

Ed may vary over the distance between the center of data storage disk 126 and the outer edge of data storage disk 126, with the magnitude of Ed being the greatest at the outer edge of data storage disk 126. Ed should be selected in accordance with the maximum position of actuator assembly 134 in the negative θ direction. A budget for Ed can be assessed for L.

As noted above, upper focus stop 140 functions to prevent contact between lens 156 and data storage disk 126. To ensure that lens 156 does not come into contact with data storage disk 126 even when the disk is deflected in the positive β direction and focus arm 146 rotates in the negative β direction from its normal position, actuator assembly 134 should be mounted to base 104 and/or gap G should be formed so that:

$$A < (L - Ed) \tag{3}$$

The components that form system 100 are subject to manufacturing tolerances. For example: the thickness of actuator assembly 134 from the top of lens 156 to the bottom of carbon fiber layer 176a may vary within a tolerance from actuator assembly to actuator assembly. These tolerances are static in nature for a given component. However, the static tolerances in components between and including lens 156 and data storage disk 126 should be taken into account when selecting distances A and B. Thus, actuator assembly 134 should be mounted to base 104 and/or gap G should be formed so that:

$$A > Ed + Et, \tag{4}$$

$$B > Ed + Et, \text{ and} \tag{5}$$

$$A < (L - Ed - Et), \tag{6}$$

where Et represents the tolerances in components of the system between and including the focus lens 156 and data storage disk 126.

With reference to FIG. 10b, lens 156 is positioned close to extensions 190a and 190b in the radial direction as measured from axis 152. A and B are measured with respect to the points of extensions 190a and 190b that engage lower focus stop 212 and upper focus stop 140, respectively. Ideally, the radial distances, measured with respect to the axis line 152 (FIG. 9a) of lens 156 and points on extensions 190a and 190b that engage lower focus stop 212 and upper focus stop 140, respectively, should be as close to each other as possible. Because the radial distances of lens 156 and points on extensions 190a and 190b that engage lower focus stop 212 and upper focus stop 140, respectively, are relatively long, the rotational travel of the points of extensions 190a and 190b substantially equals the rotational travel of lens 156. Thus, mounting actuator assembly 134 and/or forming gap G in accordance with equations (4)–(6) above ensures that lens 156 will not contact data storage disk 126, and that focus arm 146 has sufficient room to travel in the positive or negative β directions to bring lens 156 into focus with data storage disk 126 should data storage disk 126 vary from its normal position.

As mentioned above, actuator assembly 134 is capable of rotation about pivot pin 142 in the positive or negative θ direction as shown, for example, in FIG. 7b or 8b. Actuator assembly 134 includes tracking coil 170, which is a part of the rotation motor for rotating the actuator assembly about pivot pin 142. The rotation motor also includes an array of permanent rotation magnets (not shown) mounted indirectly to base 104 above tracking coil 170. A variably controlled electrical current is provided to tracking coil 170 via flex circuit 202 (FIGS. 7a and 7b). The variably controlled currents provided to focus coil 172 and tracking coil 170 originates with the system electronics. The variably controlled current flowing through tracking coil 170 creates a variably controlled magnetic field that interacts with the permanent magnetic field created by the array of permanent rotation magnets. The interaction of these magnetic fields causes actuator assembly 134 to controllably rotate about actuator assembly pivot pin 142 in the positive or negative θ directions depending on the magnitude and/or polarity of current provided to tracking coil 170. Through this action, lens 156 of OPU 154 may be controllably positioned underneath any of the concentric data tracks of data storage disk 126 for the purpose of reading or writing data thereto.

Although actuator assembly 134 is rotatable in the positive and negative θ directions, this rotation should be limited for a variety of reasons. For example, rotation of actuator assembly 134 should be limited to prevent contact between actuator assembly 134 and cylinder 130. If contact occurs, damage may result to actuator assembly 134 or cylinder 130. FIGS. 7a–7d illustrate one embodiment of a device for adjustably limiting the positive θ movement of actuator assembly 134. More particularly, FIGS. 7a–7d show an exemplary eccentric cam 220 rotatably mounted onto base 104. In the embodiment shown, eccentric cam 220 includes a camming surface 222 that, when engaging tracking coil 170, prevents contact between actuator assembly 134 and cylinder 130. It is noted that eccentric cam 220 is shown mounted vertically on base 104. In the alternative, eccentric cam may be mounted horizontally to base 104.

Because eccentric cam 220 is rotatable on base 104, the rotational limit of actuator assembly 134 is adjustable. The point on camming surface 222 that engages tracking coil 170 corresponds to the rotational limit of actuator assembly 134. As eccentric cam 220 is rotated, a different point on camming surface 222 can be selected to engage tracking coil 170. By rotating eccentric cam 220 clockwise (i.e., in the positive θ direction), actuator assembly 134 can rotate further in the positive θ direction so that OPU 154 can read or write data to concentric data tracks which are closer to a center point of data storage disk 126. FIGS. 7c and 7d show eccentric cam 220 in different positions. In FIGS. 7c and 7d, eccentric cam 220 engages actuator assembly 134 thereby inhibiting further rotation thereof in the positive θ direction. Contrasting FIGS. 7c and 7d illustrates the effect of adjusting eccentric cam 220 and thus the rotational limit of actuator assembly 134.

In the embodiment shown, eccentric cam 220 is manually rotatable on base 104. In another embodiment, a motor may be mounted to base 104 for rotating eccentric cam 220 in response to signals generated internally by electronics of system 100 or signals externally received by system 100.

The position of eccentric cam 220 may coincide with the innermost data track of data storage disk 126. In other words, with eccentric cam 220 engaging actuator assembly 134 at tracking coil 170, lens 156 may be positioned under the innermost data track of data storage disk 126. This innermost data track often contains important information about data storage disk 126. While eccentric cam 220 engages tracking coil 170, focus arm 146 is free to rotate about axis 152 and bring lens 156 in focus with the innermost data track on data storage disk 126.

FIGS. 7c and 7d show eccentric cam 220 placed on base 104 to engage tracking coil 170. The position of eccentric cam 220 need not be limited to that shown. For example, eccentric cam 220 can be repositioned on base 104 to engage tracking coil arm 184a. Alternatively, eccentric cam 220 can be repositioned to engage tracking arm 150 near axis line 152. Eccentric cam 220 could be also be mounted, directly or indirectly, to base 104 to engage focus arm 146 before actuator assembly 134 engages cylinder 130. Once engaged in this alternative embodiment, focus arm 146 will experience friction with the engaging eccentric cam 220 as the focus motor attempts to rotate focus arm 146 in the positive or negative β directions to bring lens 156 into focus with the innermost data track of data storage disk 126. The friction may prevent lens 156 from being moved into focus with data storage disk 126. If enough current is provided to focus coil 172, the friction may be overcome. However, attempts to focus lens 156 with data storage disk 126 while focus arm 146 engages eccentric cam 220 (or a similar device) may be erratic or slow, and may require a power drain from, for example, a battery providing power to system 100. With eccentric cam 220 engaging tracking coil 170 as shown in FIGS. 7c and 7d, no friction occurs between eccentric cam 220 and tracking coil 170 as focus arm 146 rotates in the positive or negative β directions. Indeed, tracking arm 150 rotates only in the positive or negative θ directions. Accordingly, there are benefits to placing eccentric cam 220 on base 104 as shown in FIGS. 7b–7c.

Although not shown, a second eccentric cam similar to eccentric cam 220 may be mounted to base 104 to selectively adjust the rotational limit of actuator assembly 134 in the negative θ direction. In the embodiment shown, actuator 134 is limited in the negative θ direction by a wall of base 104. With a second eccentric cam rotatably mounted to the base 104 near, for example, upper focus stop 140 and having a camming surface configured to engage focus arm 146, the rotational limit of actuator assembly 134 in the negative θ direction would also be adjustable.

In the operative state, electrical current is provided to focus coil 172 and/or tracking coil 170 of actuator assembly 134 while, for example, data is written to or read from data storage disk 126. When current flows through focus coil 172 and/or tracking coil 170, the magnetic field created by the focus coil 172 and/or tracking coil 170 interacts with the magnetic fields created by the permanent focus magnets 200a–200c and the permanent rotation magnets, respectively. The interaction of the magnetic fields maintains the position of actuator assembly 134. However, in the non-operative state, no current is provided to focus coil 172 and/or tracking coil 170. As a result, no magnetic fields are created by focus coil 172 and/or tracking coil 170 to maintain the position of actuator assembly 134. In the non-operative state, actuator assembly 134 may freely move in response to whatever force is applied thereto. Free movement of actuator assembly 134 may result in damage thereto as a result of, for example, shocks experienced by actuator assembly 134 when it repeatedly bounces off of upper focus stop 140 or eccentric cam 220.

Parking arm 136 (FIGS. 7a–7d) is an exemplary device for preventing free movement, and thus damage, to actuator assembly 134 while it is in the non-operative state. As noted above, parking arm 136 is mounted to base 104 and is rotatably moveable about parking pivot pin 160 between parked and unparked positions (FIGS. 7b and 7c). In one embodiment, a parking motor is provided for moving parking arm 136 between the parked and unparked positions.

With reference to FIGS. 11a–11d, parking arm 136 includes a steel plate 230, a counterweight 232, an arm 234, a wedge 236, a permanent parking magnet 240, a magnet housing 242, and a parking pivot pin 160. Magnet 240 can be more clearly seen in FIGS. 11b and 11d. Steel plate 230 operates to complete a magnetic circuit created by magnet 240 and a steel plate 246 (FIGS. 12 and 13), as more fully described below.

In one embodiment, arm 234, magnet-housing 242, and wedge 236 may be integrally formed, for example, from an thermoplastic material such as nylon, teflon, delrin, or a teflon filled polycarbonate. An aperture formed through arm 234 fixedly receives parking pivot pin 160. Counterweight 232 is also fixedly attached to arm 234 and acts to balance rotation of parking arm 136 about pivot pin 160 when parking arm 136 is mounted to base 104.

Figure 12:
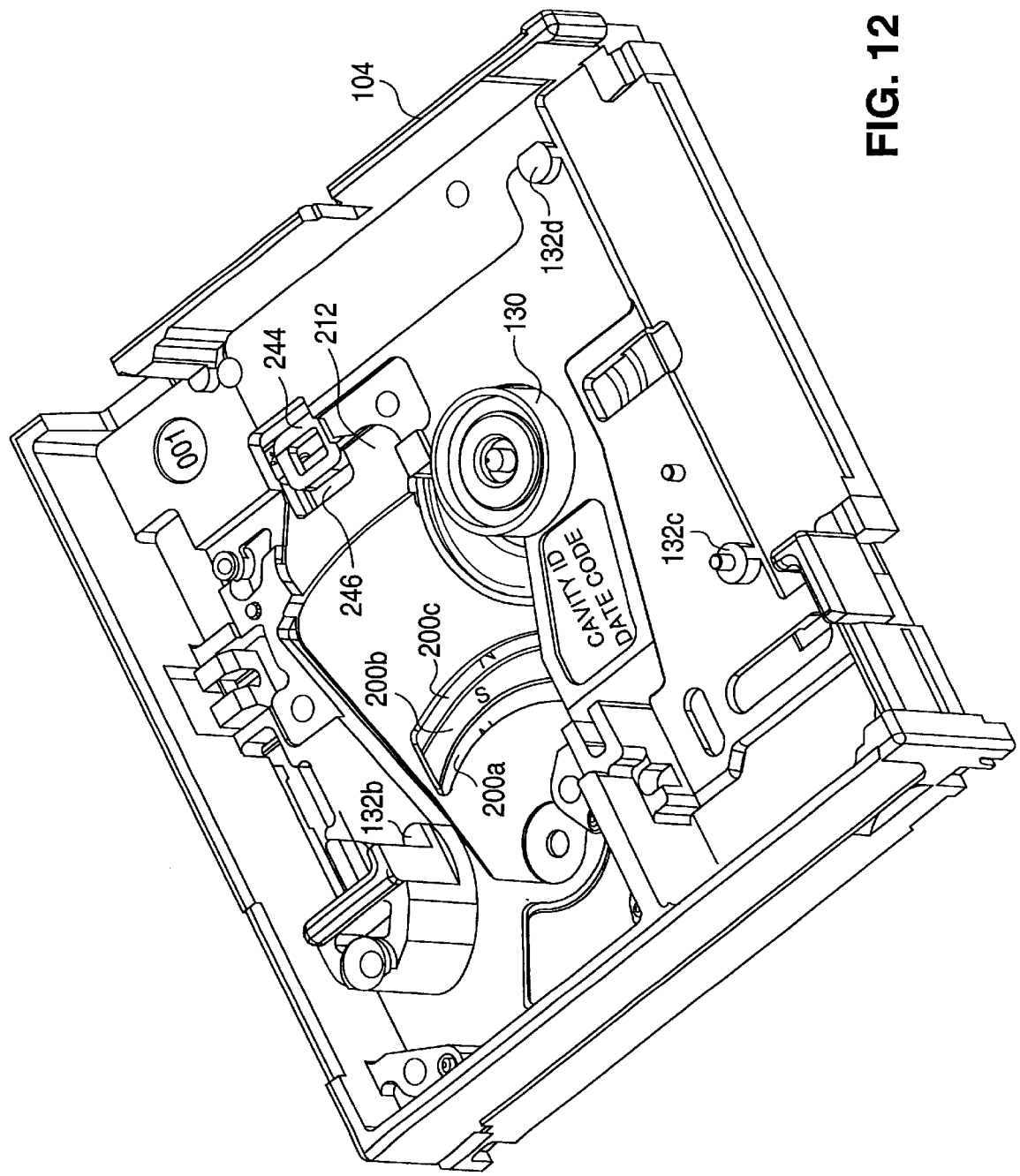
FIG. 12 is a perspective of the system shown in FIG. 7a with several components removed to illustrate additional exemplary components.
Figure 13:
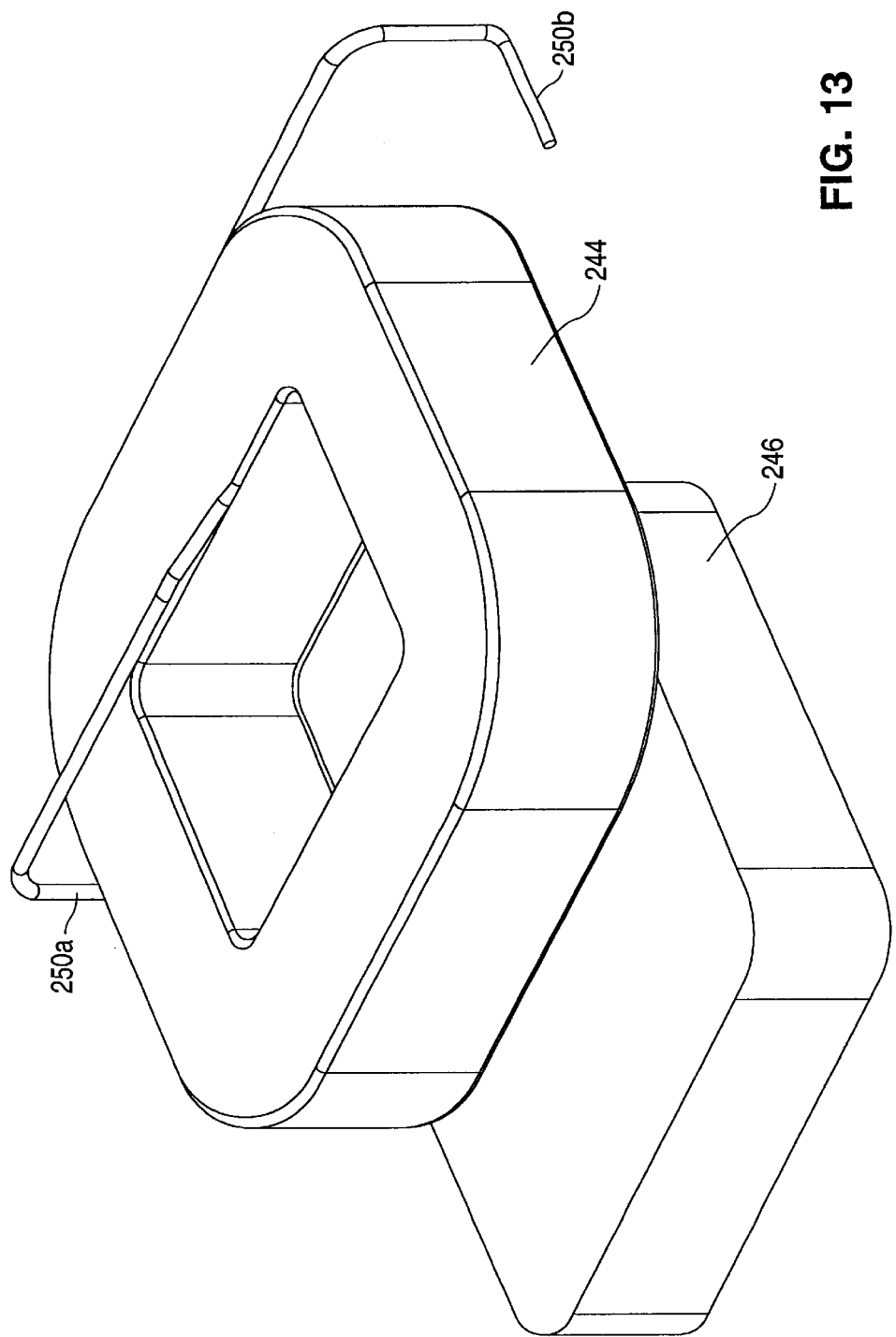
FIG. 13 shows a perspective view of a parking coil and steel plate shown in FIG. 12.

Steel plate 230 and permanent parking magnet 240 of parking arm 136 are also exemplary components of the parking motor mentioned above. FIG. 12 is a perspective view of system 100 shown in FIG. 7a with actuator assembly 134, upper focus stop 140, and parking arm 136 removed to show other exemplary components of the parking motor. More specifically, FIG. 12 shows a parking wire coil 244 and steel plate 246. Parking coil 244 is a component of an electromagnet. FIG. 13 shows a perspective view of parking coil 244 and steel plate 246. Parking coil 244 and steel plate 246 are mounted to the PCB which, in turn, is mounted to the underside of base 104. Parking coil 244 includes wire leads 250a and 250b that are coupled to bond pads (not shown) of the PCB so that system electronics can provide current to parking coil 244 without an intervening flex circuit, like the flex circuit that transmits current to focus and tracking coils 172 and 170, respectively. Parking coil 244 and steel plate 246 extend through apertures in base 104 to take the position shown in FIG. 12.

Operational aspects of the parking motor will be explained with reference to FIGS. 14a through 14f. However, before operational aspects of the parking motor are explained, some background on the creation of Lorentz forces may be helpful. FIG. 14f shows a length of wire 248 from parking coil 244 through which electric current $i_{cw}$ flows. Current $i_{cw}$ is selectively provided by system electronics. Although parking magnet 240 is not shown in FIG. 14f, parking magnet 240 creates a magnetic field B that envelopes wire length 248. For purposes of explanation, FIG. 14f shows only one flux line 250 of the magnetic field B passing through wire length 248. The exact orientation of the magnetic field B on each length of wire of parking coil 244 is slightly different, as the flux lines of magnetic field B are not all parallel or straight and are not of equal magnitude.

The interaction of $i_{cw}$ with magnetic field B creates a Lorentz force $F_{cw}$. $F_{cw}$ acts on wire length 248 in a direction 90 degrees to the direction of $i_{cw}$ and in a direction perpendicular to the plane defined by the current $i_{cw}$ vector and the magnetic field B vector. The magnitude of $F_{cw}$ is proportional to the magnitude of B, the length of the wire, and the magnitude of $i_{cw}$. Since parking coil 244 is fixedly connected to the base 104 via a printed circuit board, $F_{cw}$ cannot move parking coil 244. The total Lorentz force FC acting on parking coil 244 is the sum of the Lorentz forces $F_{cw}$ for each wire leg of parking coil 244.

Figure 14A:
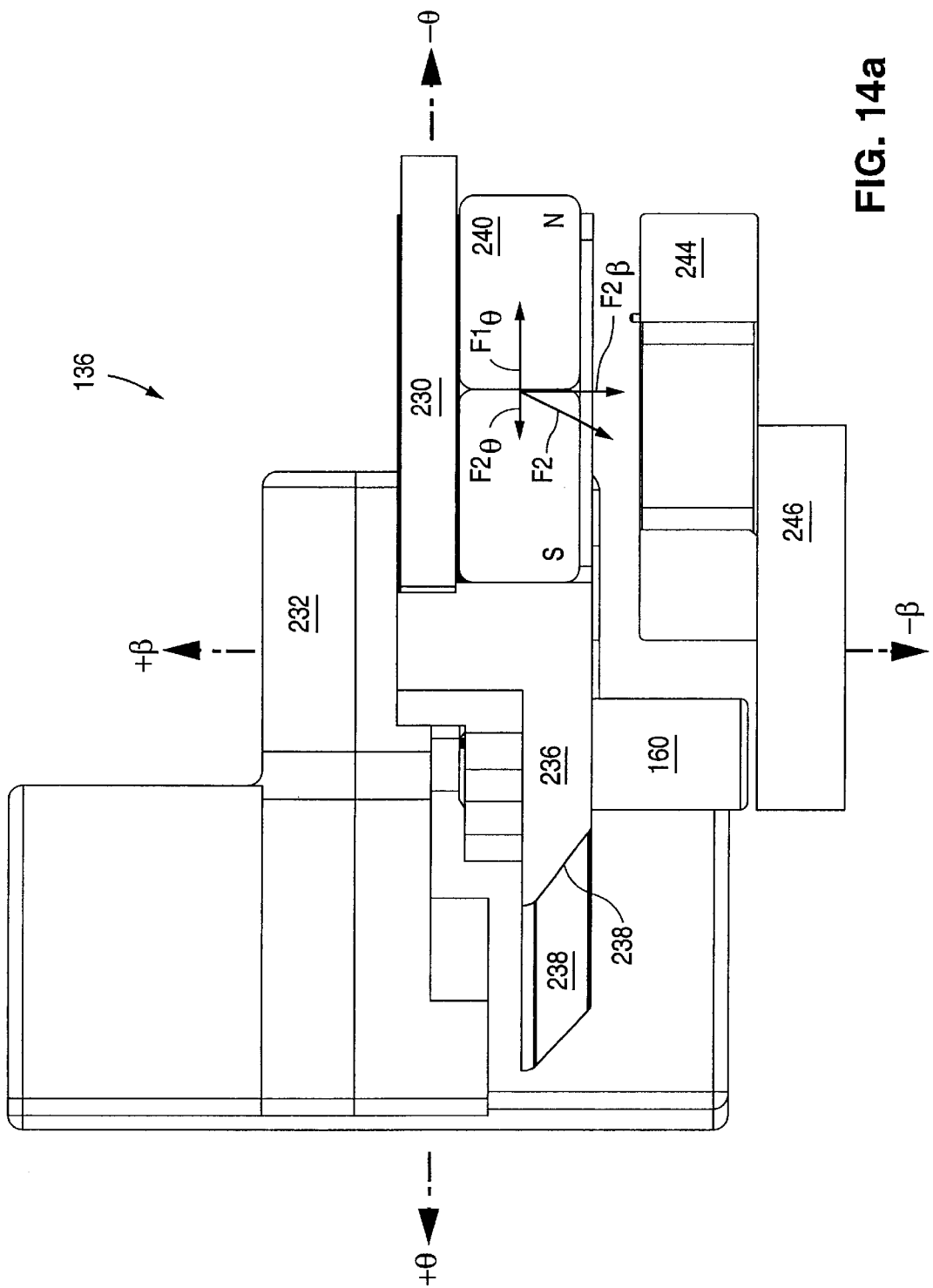
FIGS. 14a–14e show isolated cross-sectional views of the parking arm, parking coil and steel plate of FIGS. 11a–13.
Figure 14B:
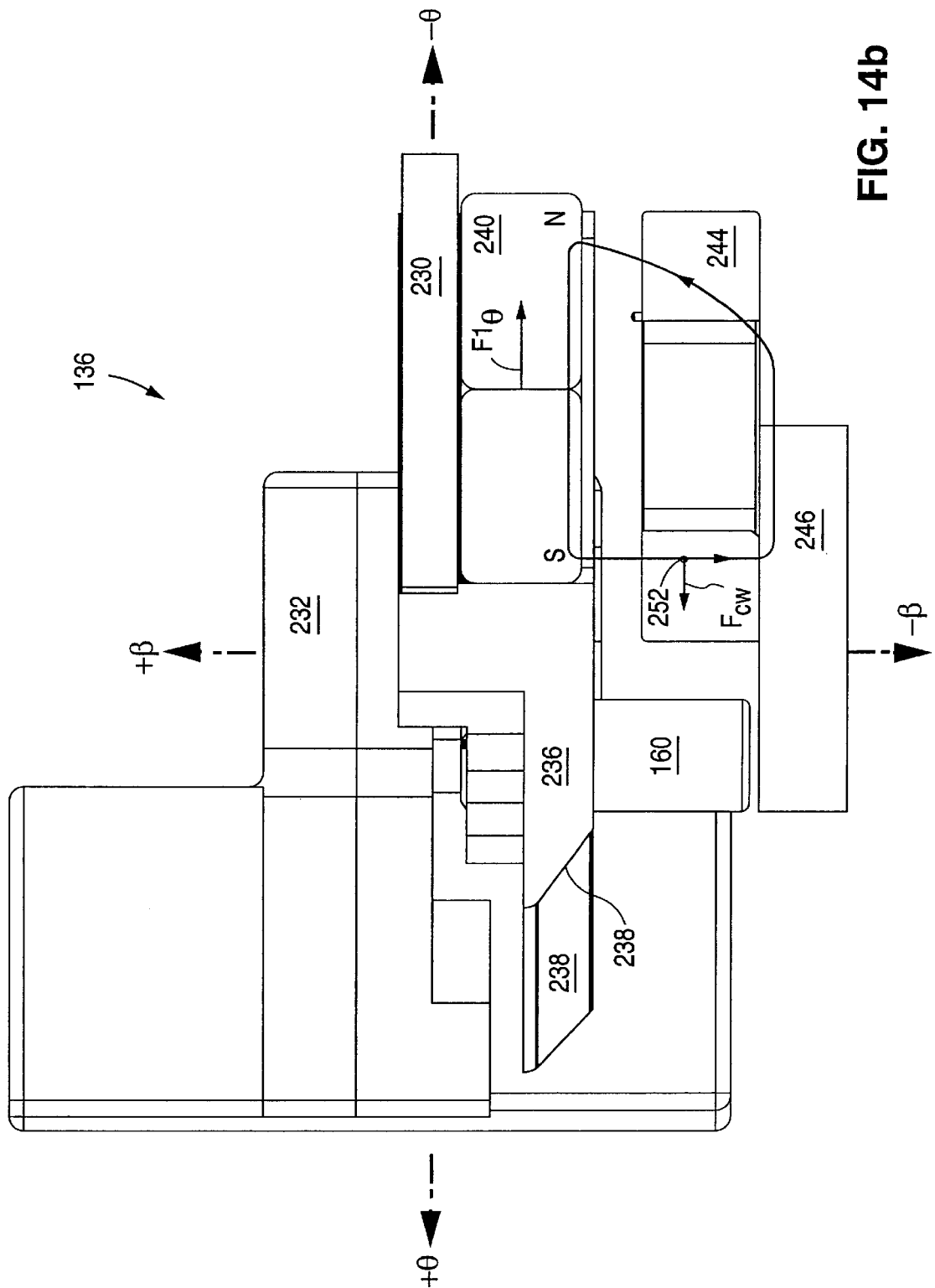
Figure 14C:
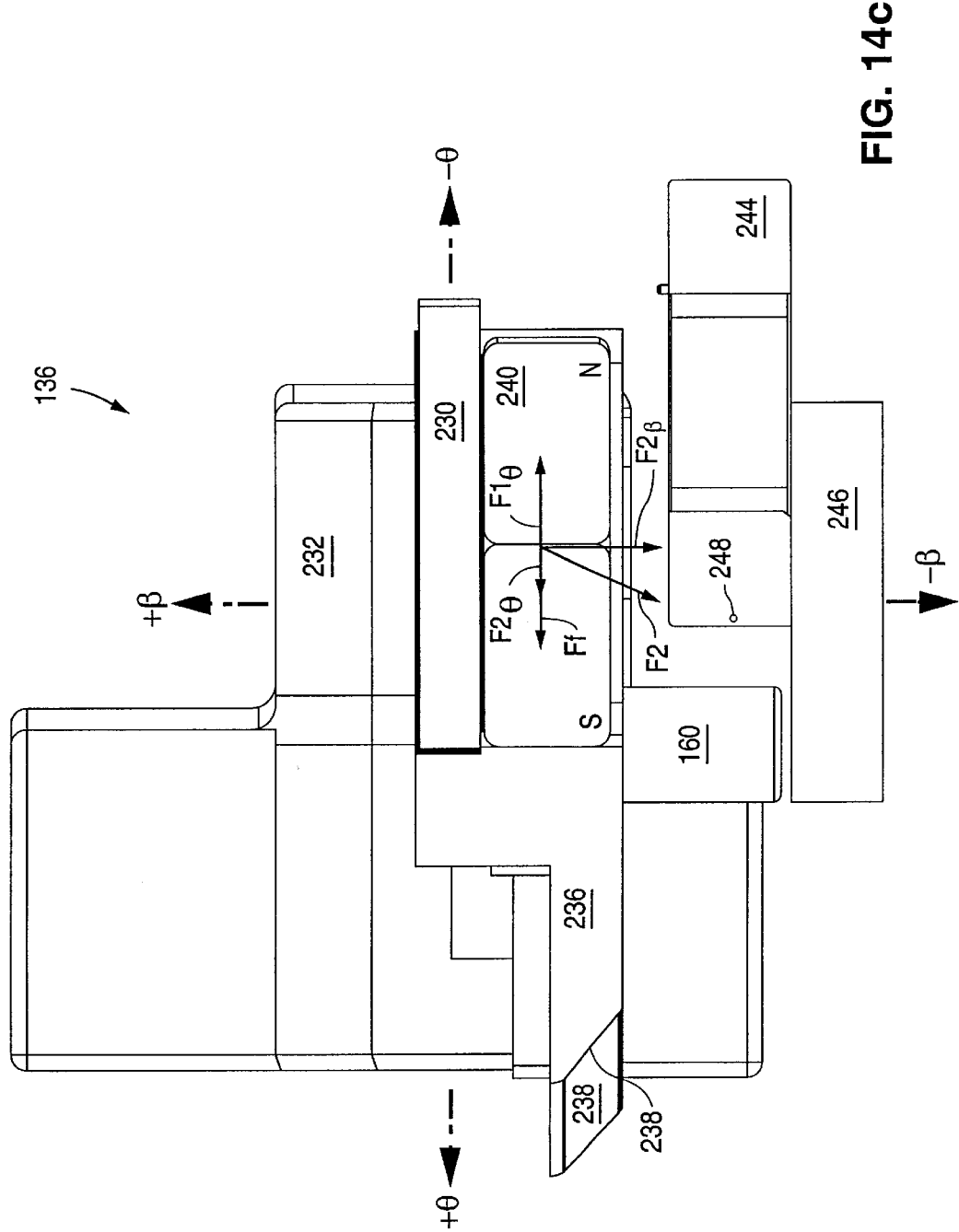
Figure 14D:
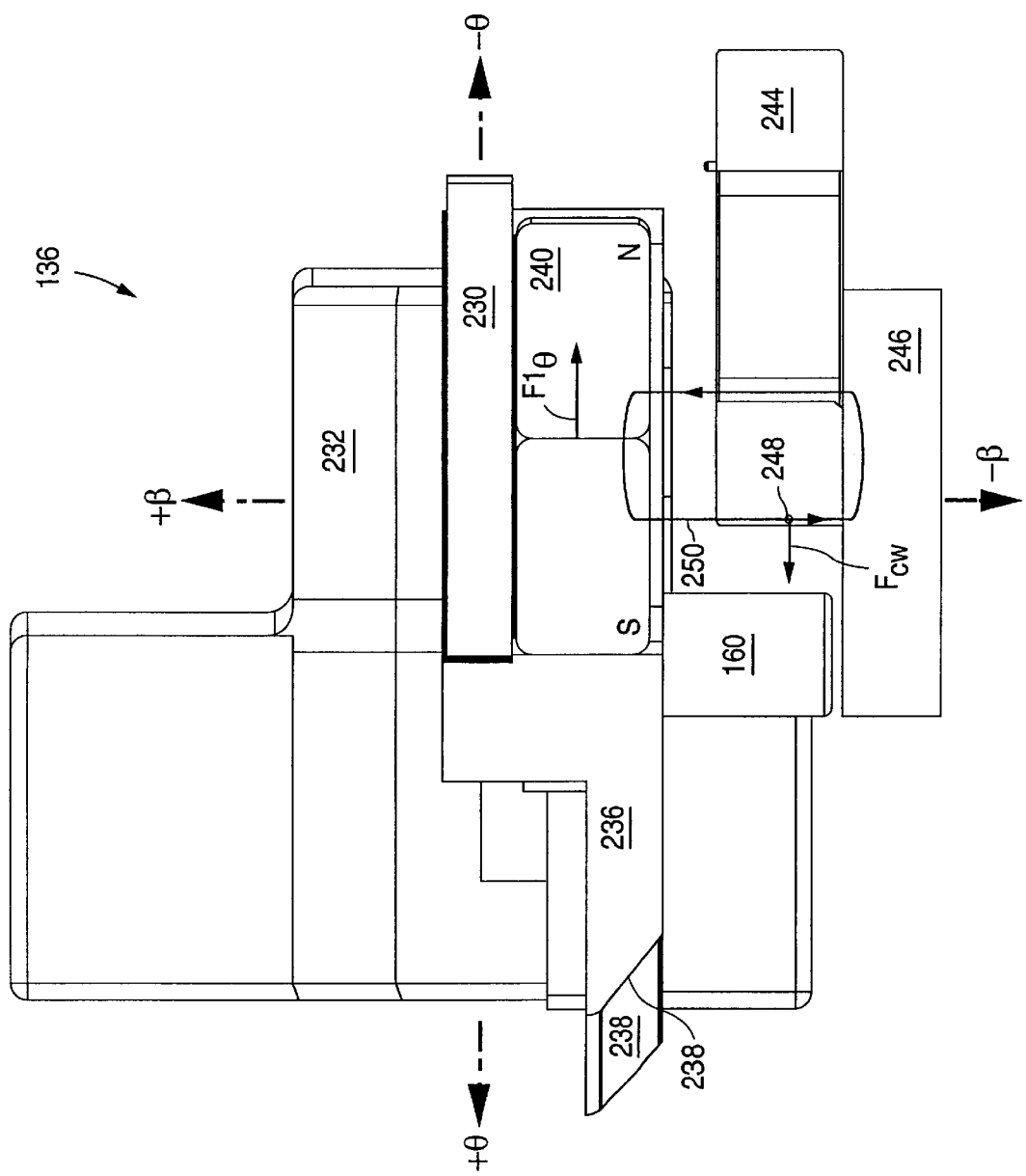
Figure 14E:
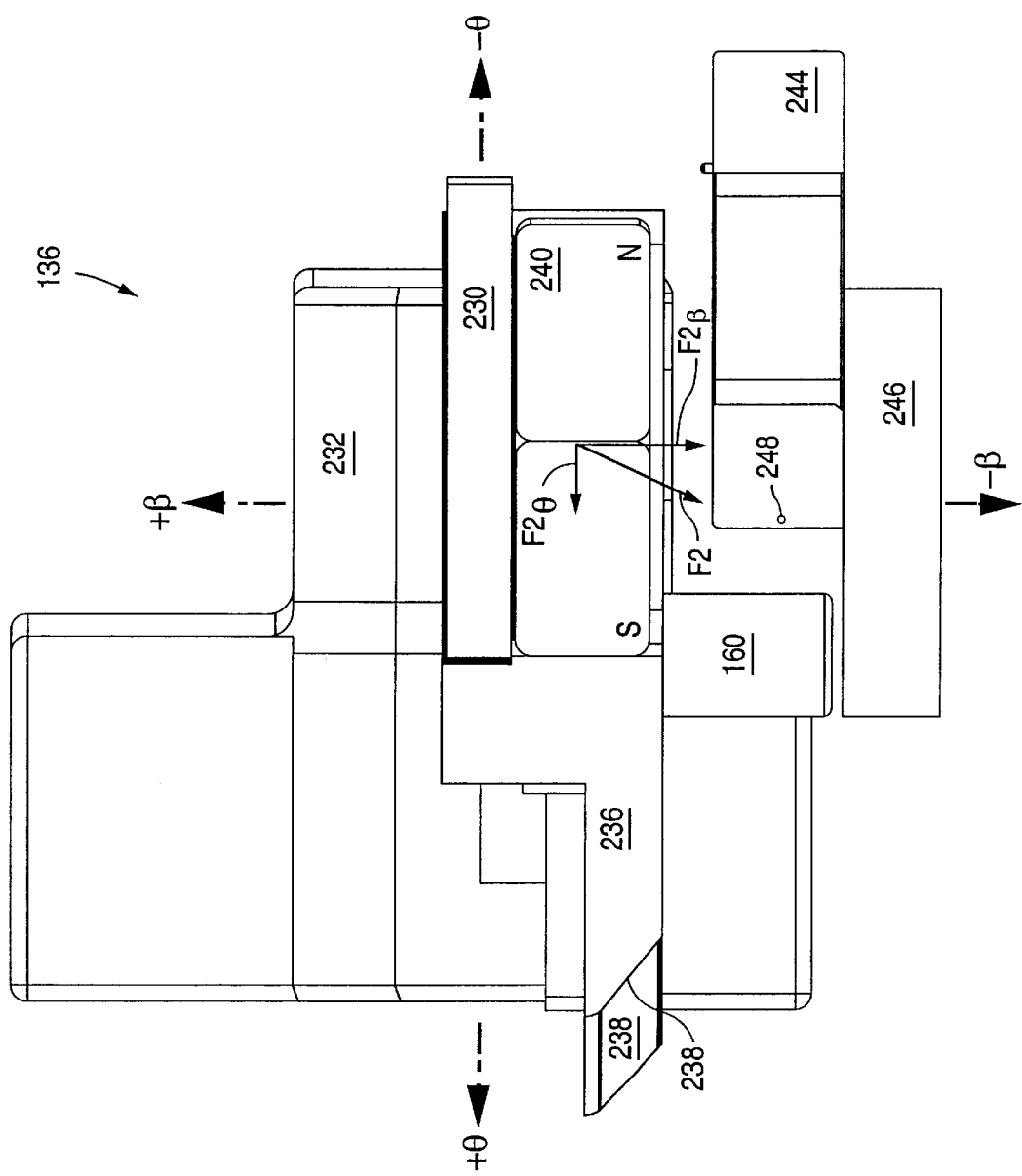
Figure 14F:
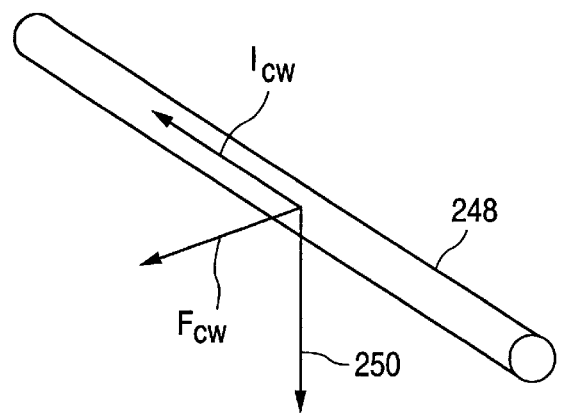
FIG. 14f illustrates operational aspects of creating Lorentz forces within the parking coil of FIGS. 14a–14e.

FIG. 14a and FIG. 14b show isolated cross-sectional views of parking arm 136, parking coil 244 and steel plate 246 in the unparked state. FIGS. 14c, 14d, and 14e show isolated cross-sectional views of parking arm 136, parking coil 244 and steel plate 246 in the parked state. As noted, parking arm 136 is capable of rotation about parking pivot pin 160 in the positive and negative θ directions between the parked and unparked states.

FIG. 14e shows parking arm 136 in the parked state with no current $i_{cw}$ flowing through parking coil 244. As noted above, parking arm 136 secures actuator assembly 134 from movement. In the parked state, counterweight 232 counterbalances parking arm 136 at pivot pin 160 so that parking arm 136 will not rotate out of the parked state if system 100 experiences an external mechanical shock in any direction in the θ plane. Additionally, because parking arm 136 rotates in the positive or negative θ directions (i.e., in the θ plane), parking arm 136 should be able to withstand mechanical shocks in a direction perpendicular to the θ plane.

In FIG. 14e, F2 represents the force of attraction between base steel plate 246 and parking magnet 240. F2 consists of orthogonal $F2_\theta$ and $F2_\beta$ components. With continued reference to FIG. 14e, FIG. 14d illustrates that a Lorentz force $F_{cw}$, described above with reference to FIG. 14f, is created when current $i_{cw}$ is first provided to parking coil 244 by system electronics. For purposes of explanation, FIG. 14f shows only one Lorentz force $F_{cw}$ acting on one wire segment 248 of coil 244. When all the Lorentz forces $F_{cw}$ acting on respective wire segments of parking coil 244 are summed, a collective Lorentz force FC is created. A force F1 equal and opposite to FC, is created when FC is created. F1 acts on parking arm 136. For purposes of explanation, FIG. 14d shows only $F1_\theta$, the θ component of F1, it being understood that an orthogonal β component of F1 is also created. $F1_\theta$ is equal and opposite to $FC_\theta$.

With continued reference to FIGS. 14d and 14e, FIG. 14c shows both forces $F1_\theta$ and F2 acting on parking arm 136 when current $i_{cw}$ is first provided to parking coil 244. Additionally, FIG. 14c shows frictional force Ff acting on parking arm 136. As noted above, $F1_\theta$ results from current $i_{cw}$ flowing through coil 244 in the presence of magnetic field B. $F1_\theta$ is in a direction opposite to $F2_\theta$, one of the orthogonal components of F2. Ff is in the same direction as $F2_0$ and results from friction between the parking arm 136 and, for example, base 104. The frictional force Ff can be calculated as a function of $F2_\theta$ and the coefficient of friction Mu between, for example, the parking arm 136 and base 104.

To unpark parking arm 136 from the parked state, $F1_\theta$ should exceed $F2_\theta$ plus Ff. It is a design goal to unpark parking arm 136 with the lowest current $i_{cw}$ possible to save power. This can be done by increasing the magnetic field B, the number of turns times current, minimizing the gap between parking coil 244 and parking magnet 240, and/or minimizing the coefficient of friction Mu between the parking arm 136 and base 104.

FIG. 14b shows parking arm 136 in the unparked state. As will be more fully described below, parking coil 244 is energized with current $i_{cw}$ to maintain parking arm 136 in the unparked state. The magnitude of current $i_{cw}$ to maintain parking arm 136 in the unparked state should be less than the magnitude of $i_{cw}$ needed to unpark parking arm 136. In FIG. 14b the interaction of $i_{cw}$ flowing through wire 248 and the magnetic field B creates Lorentz force $F_{cw}$. For purposes of explanation, FIG. 14b shows only one Lorentz force $F_{cw}$ 248 acting on wire segment 252 of coil 244 through which current $i_{cw}$ flows. When all the Lorentz forces $F_{cw}$ acting on respective wire segments of parking coil 244 are summed, a collective Lorentz force FC is created. A force F1 that is equal and opposite to FC, is created when F1 is created. F1 acts on parking arm 136. For purposes of explanation, FIG. 14b shows only the θ components of F1 and FC, it being understood that orthogonal β components of F1 and FC are also created.

FIG. 14a shows F1$_θ$ resulting from the current in the coil 24 (FIG. 14b) as well as F2 which is the attractive force of the magnets to the base steel plate 246. F2$_θ$, the horizontal component of F2, works in the direction opposite that of F1$_θ$. Because parking magnet 240 is positioned further away from the parking coil 244 in the positive θ direction, the magnitude of force vector F2$_θ$ is greater than that shown in FIG. 14c. The result is a stronger F2$_θ$ to park the parking arm 136 when coil 244 is deenergized.

When coil 244 is de-energized, F1 is eliminated. When parking arm 136 parks focus arm 146, $F_f$ appears. Here, $F_f$ will be in the direction opposite that of F2$_θ$ and have a magnitude of F2$_β$ multiplied by Mu. Thus, the parking arm 136 will park when:

$$F2_θ > F2_β * Mu, \text{ or } F2_θ > F_f \quad (7)$$

The magnitude of F2$_θ$ in FIG. 14c is smaller than in FIG. 14a, since the parking magnet 240 is nearly aligned vertically with base plate 246 in FIG. 14c. In other words, the attractive force between the parking magnet 240 and base plate 246 is largely in the β direction in FIG. 14c. It is noted that F1 and F2 in FIG. 14a are different than F1 and F2 shown in FIG. 14c.

Figure 15:
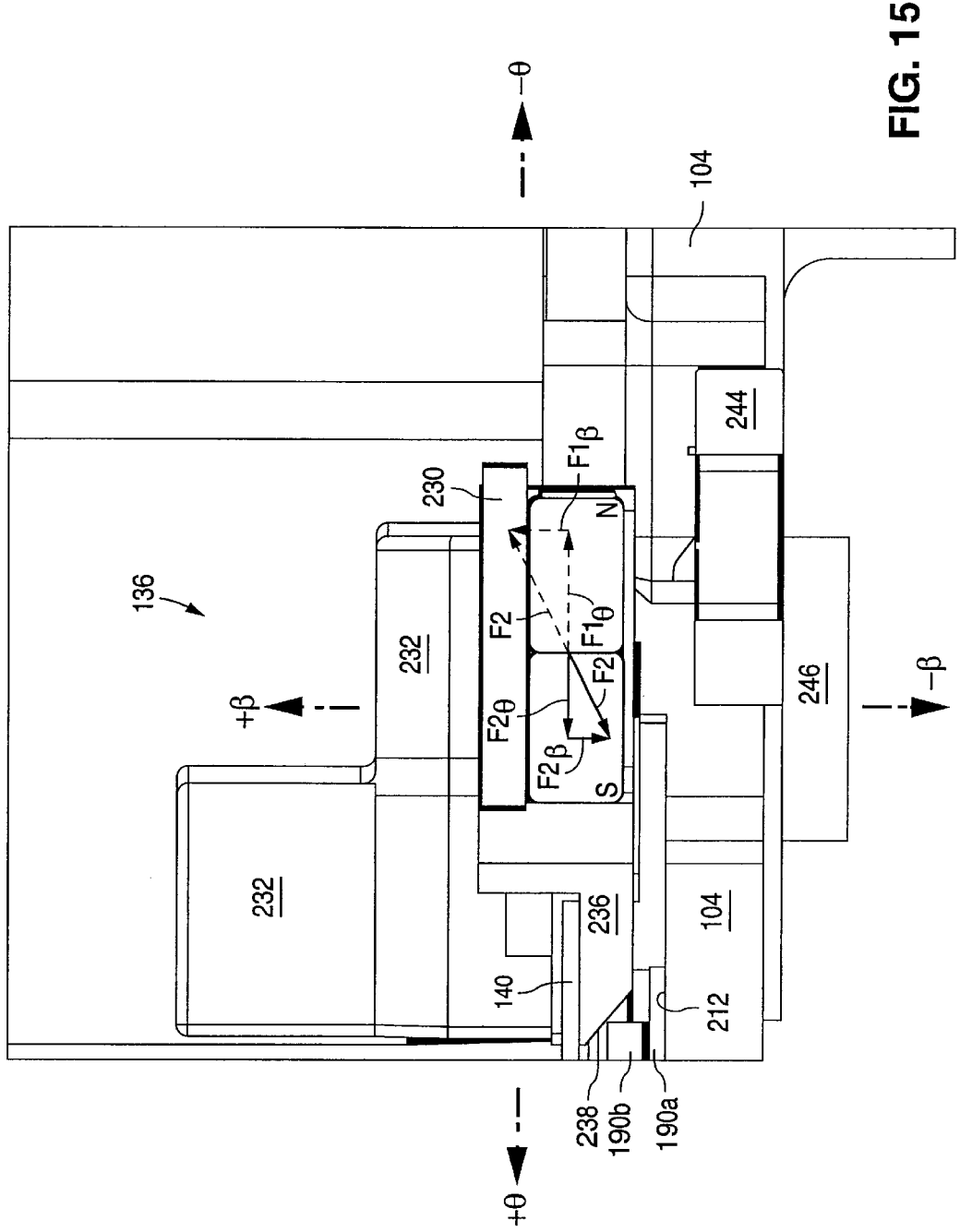
FIG. 15 is a cross-sectional view of system 100 shown in FIG. 7c taken along line DD thereof.

FIG. 15 is a cross-sectional view of system 100 shown in FIG. 7b taken along line DD thereof and illustrates operational aspects of parking actuator assembly 134. When current I1 to parking coil 244 is terminated, F1 is eliminated. Force F2$_θ$ causes parking arm 136 to rotate in the positive θ direction and drive wedge 236 into the gap between extension 190b and upper focus stop 140. Force F2$_θ$ is sufficient in magnitude to drive wedge 236 into the gap between extension 190b and upper focus stop 140, after (1) wedge 236 first engages upper focus stop 140, or (2) wedge 236 first engages extension 190b. Thus, F2$_θ$ causes wedge 236 to slide against the bottom surface of upper focus stop 140 or extension 190b after wedge 236 first engages upper focus stop 140 or extension 190b. While wedge surface 238 slides against extension 190b, focus arm 146 rotates about axis 152 (FIG. 8a) in the negative β direction until the bottom surface of extension 190a engages lower focus stop 212 of base 104 (FIG. 10b). With the bottom surface of extension 190a engaging lower focus stop 212, wedge surface 238 may continue to slide against extension 190b until wedge 236 engages upper focus stop 140.

As shown in FIG. 15, with wedge 236 engaging both extension 190b and upper focus stop 140, extension 190a engaging lower focus stop 212, and F2$_θ$ applied to parking arm 136, a compressive force is created in the stack consisting of the base 104, focus arm 146, wedge 236 and upper focus stop 140 that parks or inhibits movement of actuator assembly 134. Frictional force between extension 190b and wedge 236, and frictional force between extension 190a and base 104 inhibit rotation of actuator assembly 134 in the positive or negative θ directions.

At some point, with electrical current applied to focus coil 172 parking arm 136 will unpark actuator assembly 134 so that actuator assembly 134 may move in response to forces created by the rotation and focus motors. It is noted actuator assembly 134 will be in substantially the same θ position it was before it was parked.

Figure 11A:
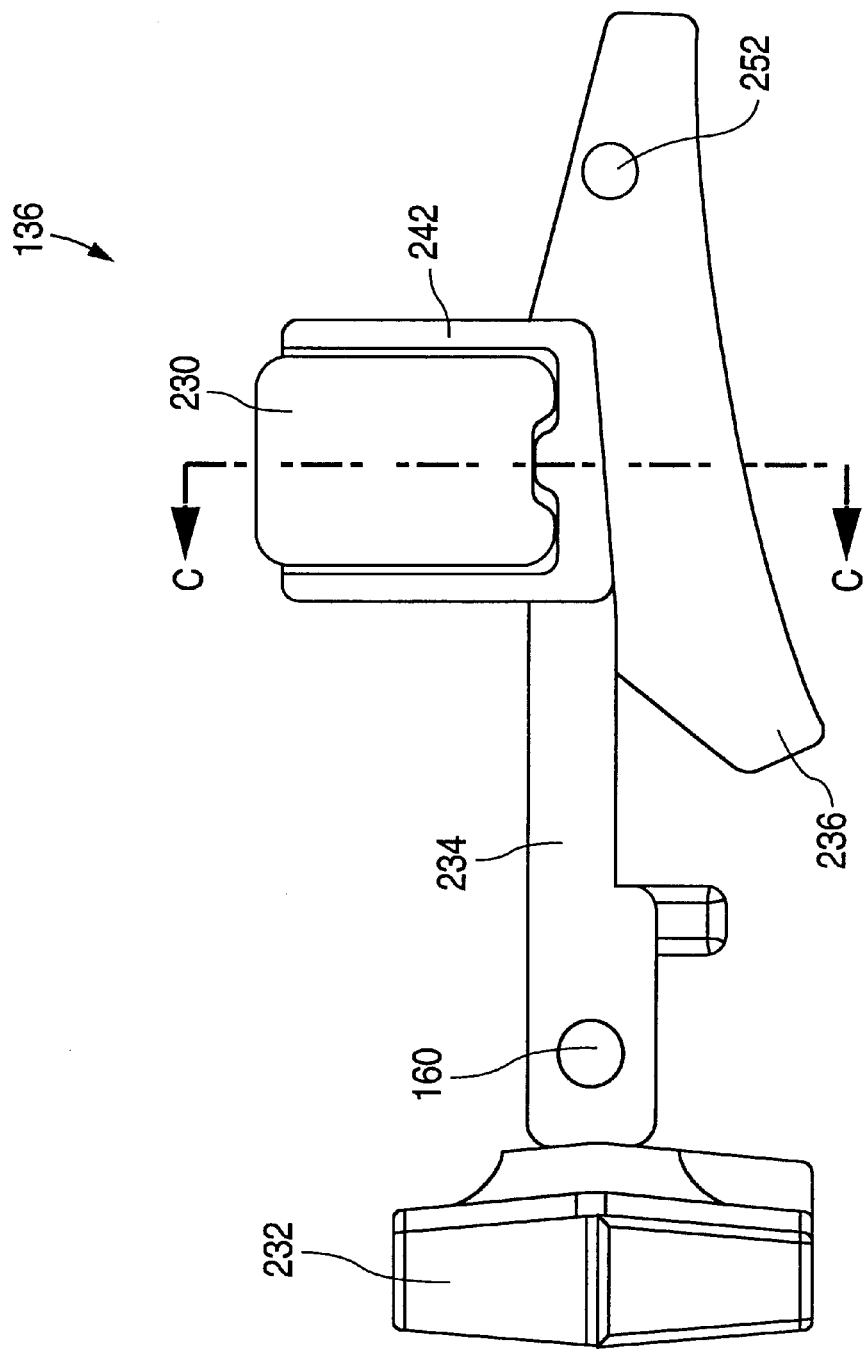
FIG. 11a is a top view of a parking arm shown in FIGS. 7a–7d.
Figure 11B:
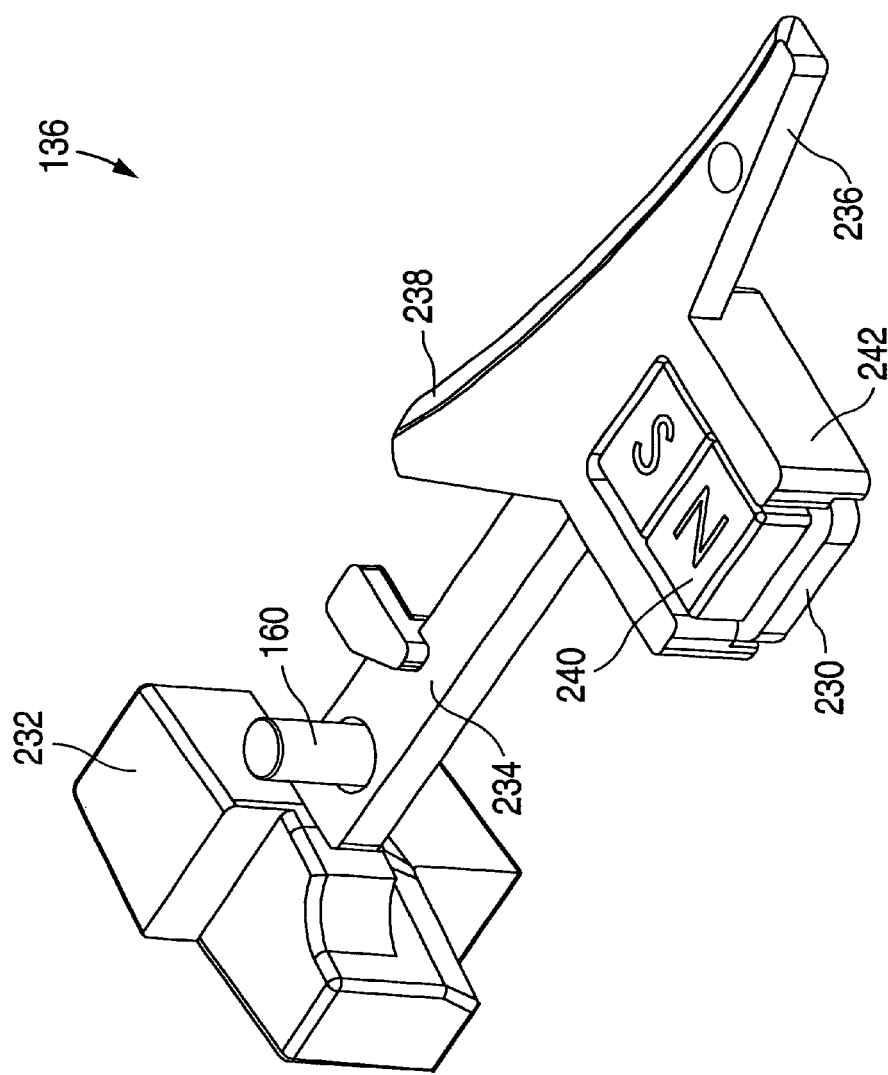
FIG. 11b is a bottom, perspective view of the parking arm shown in FIGS. 7a–7d.
Figure 11C:
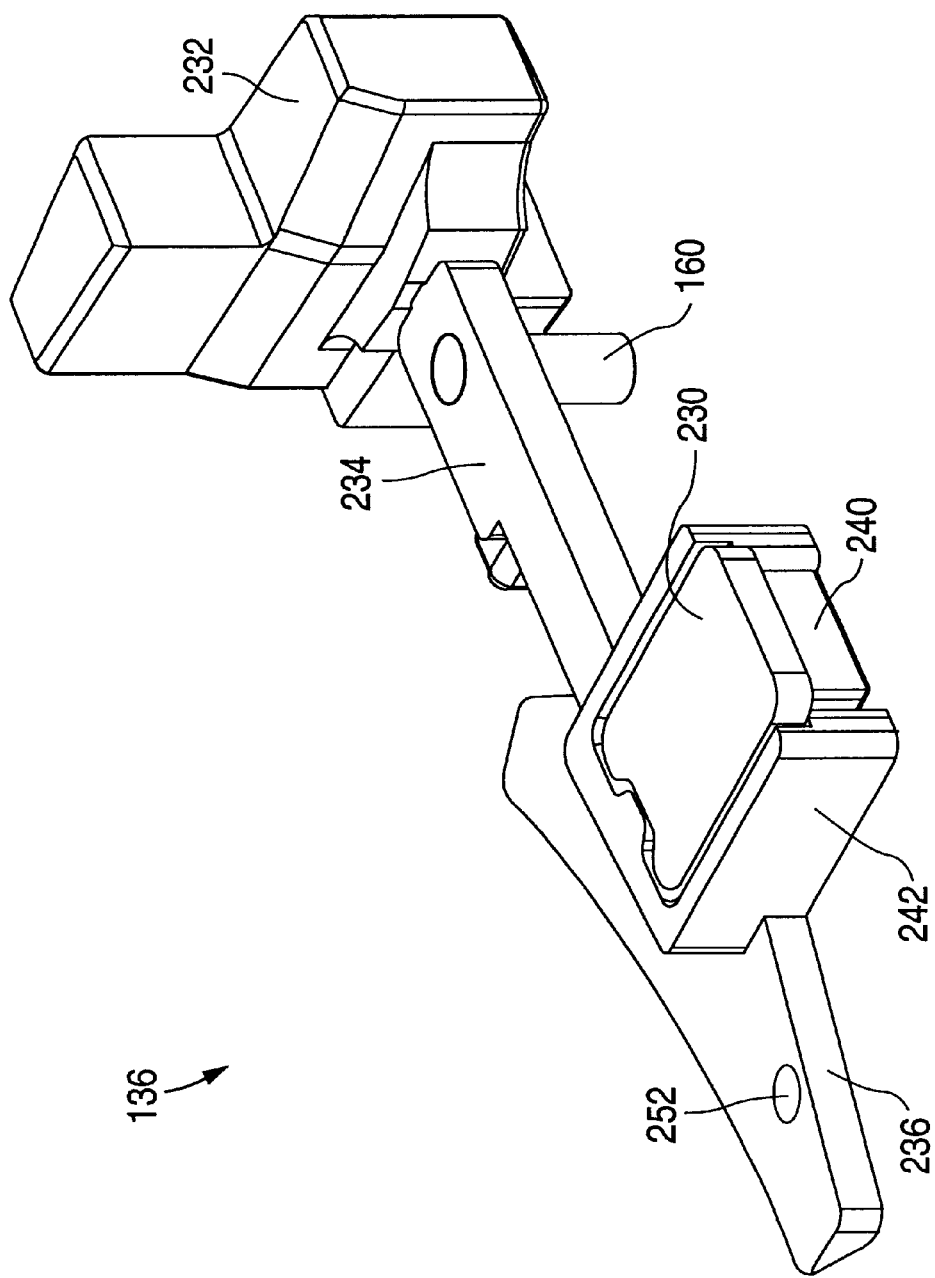
FIG. 11c is a top, perspective view of the parking arm shown in FIGS. 7a–7d.
Figure 11D:
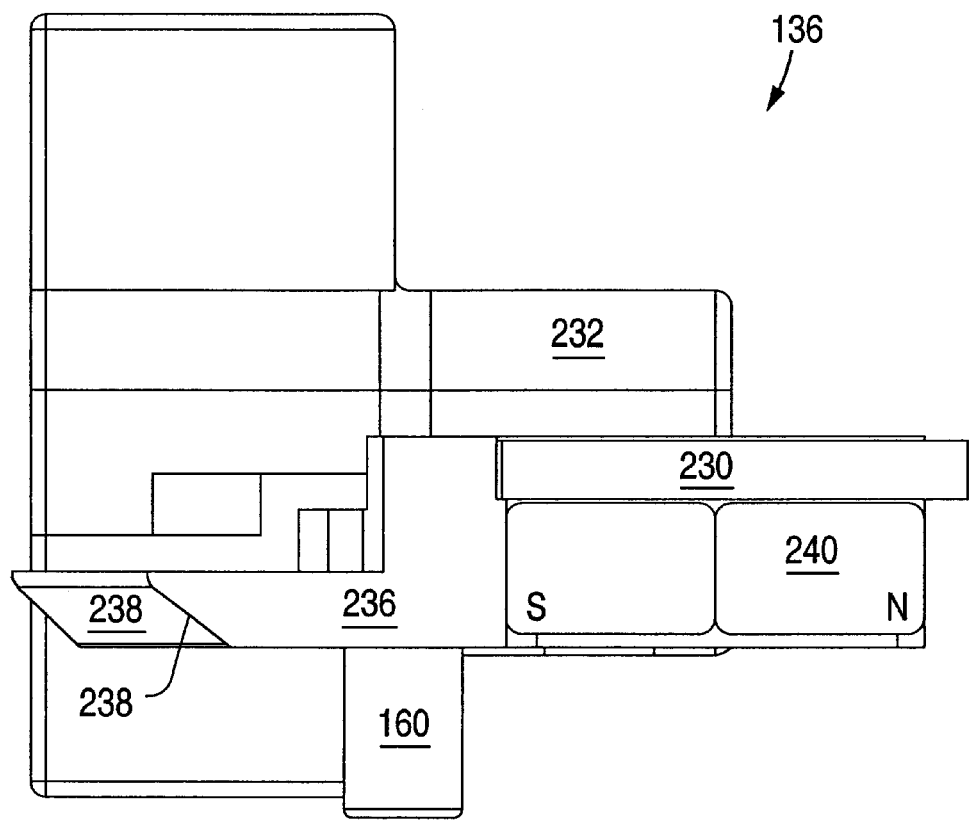
FIG. 11d is a cross-sectional view of the parking arm shown in FIG. 11a taken along line CC thereof.

Although not shown, a raised portion may be formed on wedge 236 at position 252 shown in FIGS. 11a and 11c. Ideally, this raised portion would have a rounded surface that engages upper focus stop 140 while parking arm 136 parks actuator assembly 134. The raised portion would operate to reduce friction between the parking arm 136 and upper focus stop 140.

It is noted that extension 190b is shown with a right-angled edge that engages wedge surface 238. In the alternative, this edge may be beveled to reduce the friction between wedge surface 238 and extension 190b. It is also noted that frame 144 includes carbon fiber layer 176a having extension 190a. In the alternative, carbon fiber layer 176a could be eliminated so that extension 190b engages surface (lower focus stop) 212 while actuator assembly 134 and parking arm 136 are in the parked state.

With reference to FIGS. 7a and 12, spindle motor 116 is mounted to a surface of base 104 opposite to that shown in FIG. 7a. For purposes of definition, two components can be mounted, coupled, or connected together directly or indirectly via one or more intermediate components. Cylinder 130 of spindle motor 116 extends through an aperture in base 104 and is rotatable therein. As noted above, when data cartridge 102 is fully loaded in system 100, cylinder 130 engages and rotates data storage disk 126. Z-datums 132a–132d define raised surfaces of base 104. When data cartridge 102 is fully loaded in system 100, the cartridge shell 120 (FIG. 4) rests on z-datums 132a–132d while spindle motor cylinder 130 rotates data storage disk 126. To ensure that data storage disk 126 rotates freely in cartridge shell 120, spindle motor 116 should be mounted to base 104 so that z-datums 132a–132d are contained in a plane that is parallel to and separated by a length R from a plane that defines the top of cylinder 130.

Figure 16B:
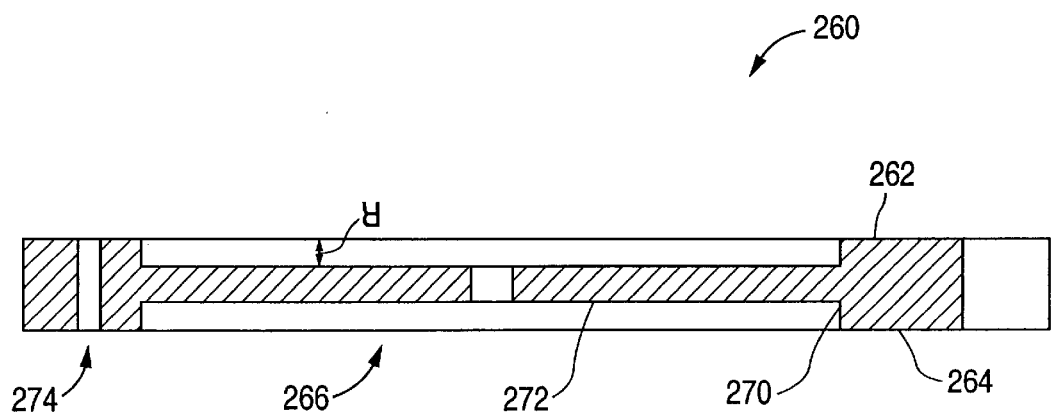
FIG. 16b is a cross-sectional view of the tool shown in FIG. 16a taken along line EE thereof.
Figure 16A:
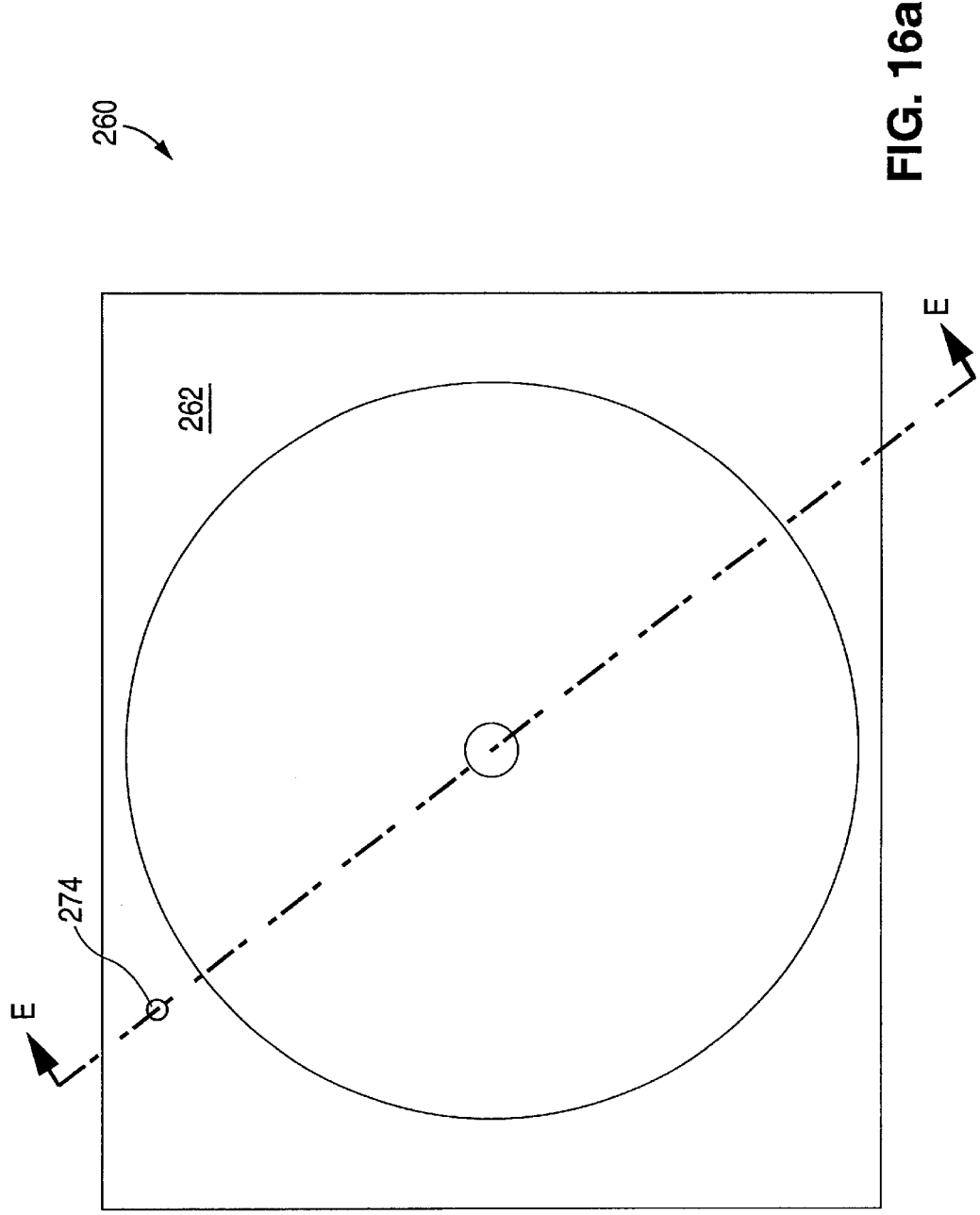
FIG. 16a is a top view of a tool used to mount the spindle motor to the base.

FIG. 16a is a top view of a tool 260 for mounting spindle motor 116 to base 110 104. FIG. 16b is a cross-sectional view of tool 260 shown in FIG. 16a taken through line EE thereof. Tool 260, in one embodiment, is integrally formed from steel or other rigid material that is attracted to a magnet. With continued reference to FIG. 16b, tool 260 has oppositely facing top and bottom surfaces 262 and 264, respectively. Bottom surface 264 should be flat or substantially flat. A disk shaped recess 266 is formed in the bottom surface 264. A recess sidewall 270 and a recess surface 272 define recess 266. Recess surface 272 should be flat or substantially flat and parallel or substantially parallel to bottom surface 264. Recess surface 272 should be separated from bottom surface 264 by length R, the same length that separates the plane containing z-datums 132a –132d from the plane that contains the top of cylinder 130. Lastly, tool 260 includes an aperture 274 extending between the top and bottom surfaces 262 and 264. Tool aperture 274 is sized to receive pin 264 extending from z-datum 132c (FIG. 12).

Figure 16C:
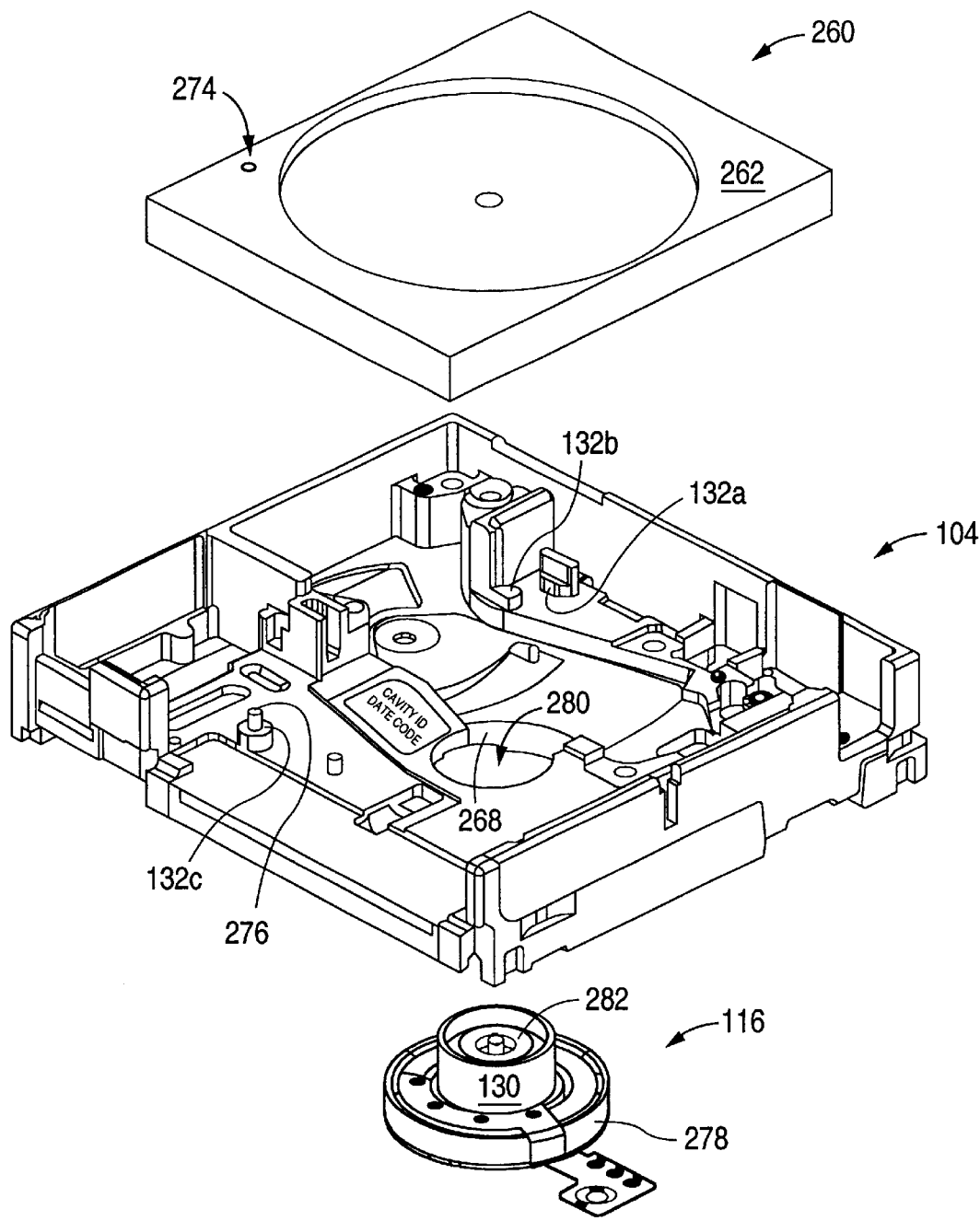
Figure 16D:
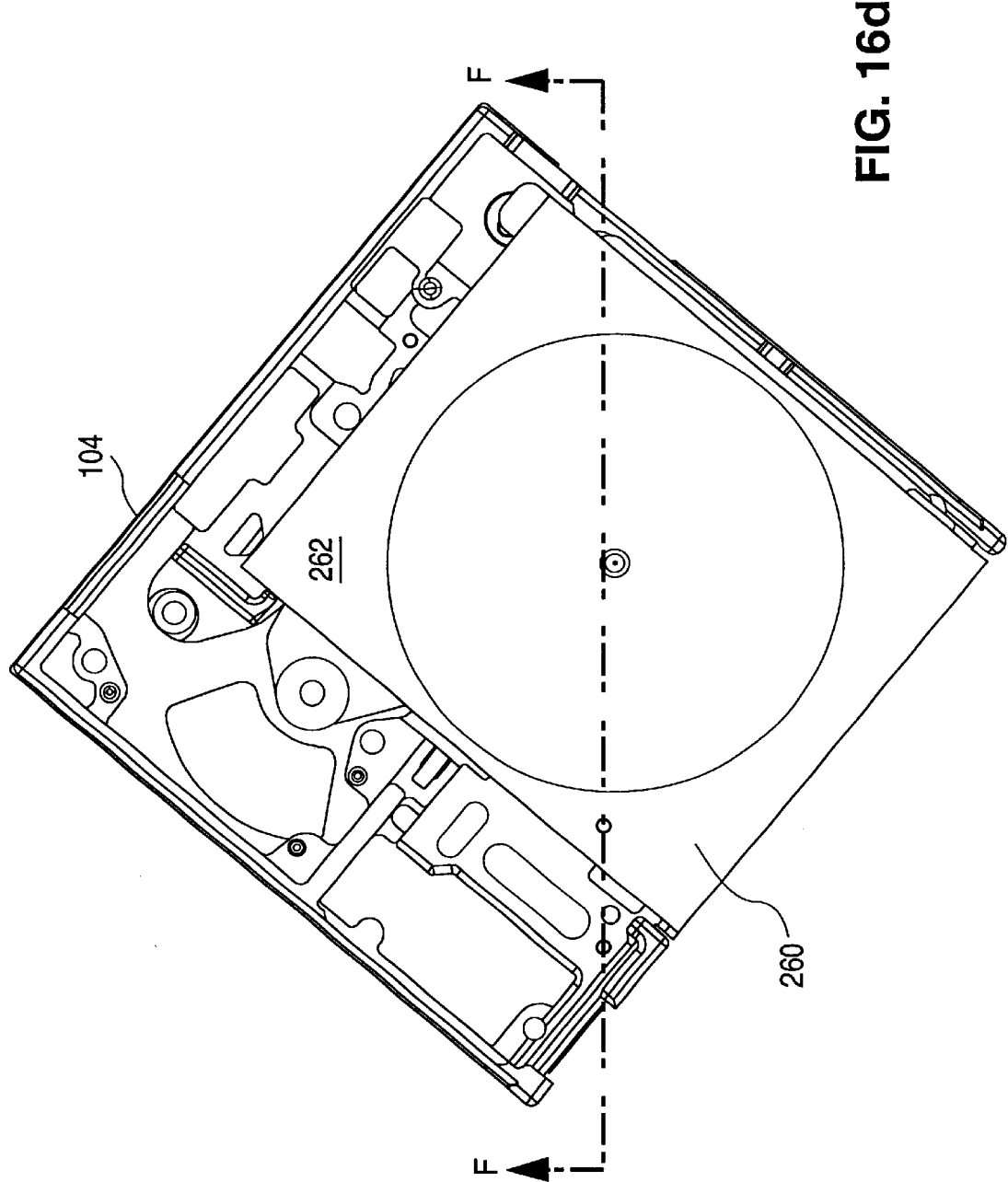
FIG. 16d is a top view of the tool and base shown in FIG. 16b.

With continued reference to FIGS. 16a and 16b, FIG. 16c shows an exploded perspective view of tool 260, base 104, and spindle motor 116. Base 104 includes an aperture 280 through which cylinder 130 extends when spindle motor 116 is mounted. Tool 260 is securely positioned on base 104 so that bottom surface 264 engages z-datums 132a–132d and datum pin aperture 274 receives datum pin 276. A clamp (not shown) can be used to secure the position of tool 260 on base 104. FIG. 16d is a top view of tool 260 securely positioned on base 104.

An adhesive such as a UV light sensitive adhesive is applied to base to motor bonding surface 268 and/or spindle motor bonding surface 278. ASEC 550 LVUV-J is one UV light sensitive adhesive that may be used. The amount of applied adhesive should be enough to coat bonding surfaces 268 and/or 278, but should be limited to prevent squeeze out of adhesive between bonding surfaces 268 and 278 when spindle motor is mounted to base 104. Thereafter, cylinder 130 is inserted through base aperture 280 until the top of cylinder 130 engages recess surface 266 of tool 260. In this position, bonding surfaces 268 and 278 engage each other with a thin layer of adhesive therebetween. It should be noted cylinder 130 may be inserted through base aperture 280 before tool 260 is positioned on z-datums 132a–132d. It should also be noted that the adhesive might be applied to bonding surfaces 268 and/or 278 after cylinder 130 is inserted through base aperture 280. In this latter embodiment, a small gap is created between bonding surfaces 268 and 278 into which the adhesive is wicked. More particularly, adhesive is provided at the end of the gap between adjacent bonding surfaces 268 and 278. The adhesive is then drawn into the gap by capillary action between the bonding surfaces 268 and 278 until the gap is filled or substantially filled.

Figure 16E:
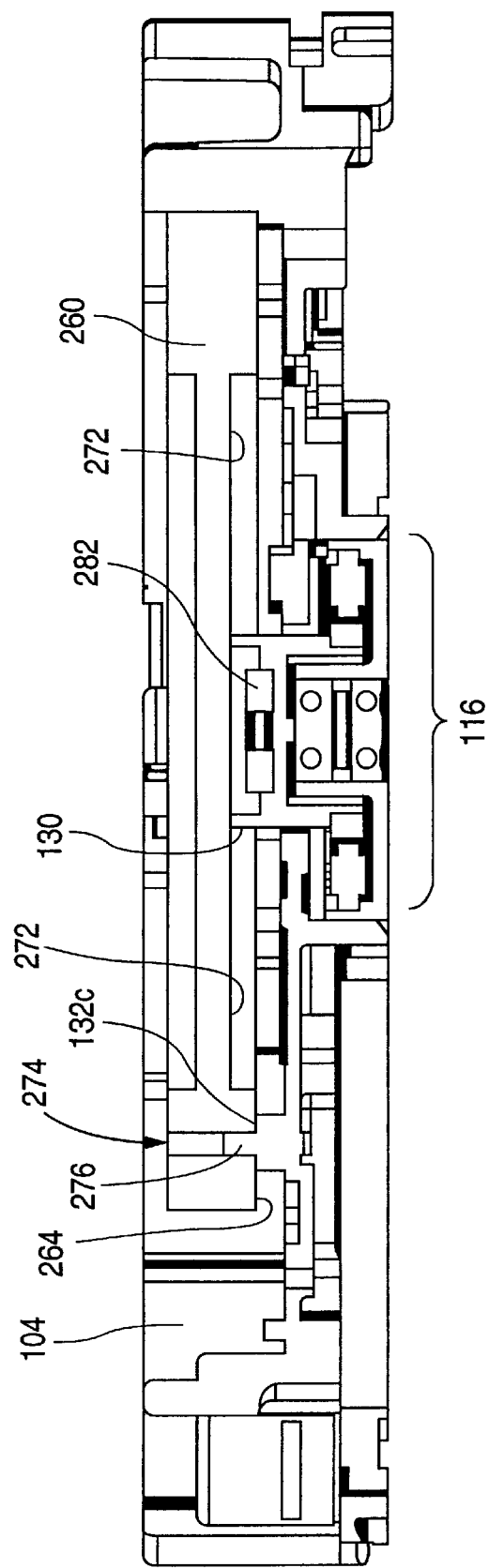
FIG. 16e is a cross-sectional view of the tool and base shown in FIG. 16 taken along line EE thereof.

FIG. 16e is a cross-sectional view taken along line FF of FIG. 16d. FIG. 16e shows cylinder 130 extending through base 104 and engaging recess surface 272, datum pin 276 received in datum pin aperture 274, and bottom surface 264 engaging z-datum 132c. A disk chuck 282 of spindle motor 116 magnetically attracts spindle motor 116 to tool 260 and operates to maintain contact between cylinder 130 and recess surface 272. With cylinder 130 engaging tool 260, the top of cylinder 130 is in proper alignment with z-datums 132a–132d. In other words, with cylinder 130 engaging tool 260, the plane containing the top of cylinder 130 is substantially parallel to and separated by R from the plane containing z-datums 132a–132d.

While the base 104, motor 116, and tool 260 are in position shown in FIG. 16e, the adhesive between base 104 and spindle motor 116 is cured to create a fixed bound therebetween. For example, UV light is applied to the UV light sensitive adhesive between base 104 and spindle motor 116 for approximately 10 to 30 seconds to first create a tacked bond between base 104 and spindle motor 116. When the adhesive is wicked into the gap between bonding surfaces 268 and 278, a UV cured surface may be formed on the adhesive. This UV cured surface may prevent oxygen from passing therethrough. Without oxygen, the remaining adhesive between bonding surfaces 268 and 278 may experience anaerobic curing to further bond the surfaces. The tacked and/or anaerobic bond is not strong, but strong enough to maintain alignment of the spindle motor through a thermal cure process to create a stronger bond. The process for creating the fixed bond can vary from 15 minutes to several hours depending on the process. After the fixed bond is created, tool 260 is separated from base 104.

Although the present invention has been described in connection with several embodiments, the invention is not intended to be limited to the specific forms set forth herein. On the contrary, it is intended to cover such alternatives, modifications, and equivalents as can be reasonably included within the spirit and scope of the invention as defined by the appended claims.

What is claimed is:

1. A method comprising:
   mounting a data storage disk to a disk rotation motor, wherein the disk rotation motor is mounted to a base;
   rotating a device about a pivot pin, wherein the pivot pin rotatably connects the device to the base, and wherein an angle exists between the pivot pin and the base;
   a circuit providing electrical current to the device as the device rotates about the pivot pin;
   monitoring the electrical current provided to the device as the device rotates about the pivot pin;
   adjusting the angle between the base and the pivot pin unless the magnitude of the monitored electrical current is constant as the device rotates about the pivot pin.

2. The method of claim 1 wherein the circuit varies the electrical current provided to the device in order to maintain a constant distance D separating the device from the data storage disk as the device rotates about the pivot pin.

3. The method of claim 2 wherein the device comprises first and second portions, wherein the first portion is rotatably mounted to the base via the pivot pin, wherein the second portion is rotatably mounted to the first portion, and wherein the distance D is measured between the second portion and the data storage disk.

4. The method of claim 3 wherein the device comprises an electromagnet mounted to the second portion, and wherein the electromagnet receives the electrical current, wherein an angular position of the second portion relative to the first portion depends on the magnitude of the electrical current provided to the electromagnet.

5. A method comprising:
   mounting a data storage disk to a disk rotation motor, wherein the disk rotation motor is mounted to a base;
   rotating a device about a pivot pin, wherein the pivot pin rotatably connects the device to the base, and wherein an angle exists between the pivot pin and the base;
   the device illuminating the data storage disk with light as the device rotates about the pivot pin;
   the device detecting light reflected from the data storage disk as the device rotates about the pivot pin;
   the device generating signals corresponding to the detected light as the device rotates about the pivot pin;
   monitoring the signals as the device rotates about the pivot pin;
   adjusting the angle between the pivot pin and the base unless the magnitude of the monitored signals is constant as the device rotates about the pivot pin.

6. The method of claim 5 wherein the device comprises first and second portions, wherein the first portion is rotatably mounted to the base via the pivot pin, wherein the second portion is rotatably mounted to the first portion, wherein the second portion is in a fixed position relative to the first portion as the first portion rotates about the pivot pin, and wherein the distance D is measured between the second portion and the data storage disk.

7. The method of claim 6 wherein a light generation device is mounted to the second portion, wherein the light generation device generates the light that illuminates the data storage disk, wherein a light detection device is mounted to the second portion, wherein the light detection device detects the light reflected from the data storage disk, and wherein the light detection device generates the signals corresponding to the detected light.

8. In an apparatus comprising a base, a disk rotation motor mounted to the base, a data storage disk mounted to the disk rotation motor, a device, and a pivot pin, wherein the pivot pin rotatably connects the device to the base, a method comprising:

rotating the device about the pivot pin;

adjusting the angular position of the pivot pin relative to the base unless the device rotates in a first plane parallel to a second plane containing a surface of the data storage disk.

9. The method of claim 8 further comprising:

providing electrical current to the device as the device rotates about the pivot pin, wherein the magnitude of the electrical current is proportional or inversely proportional to a distance D separating the device from the data storage disk;

monitoring electrical current provided to the device as the first portion rotates about the pivot pin;

wherein the device rotates in the first plane when the magnitude of the monitored electrical current is constant as the device rotates about the pivot pin.

10. The method of claim 9 wherein the device comprises first and second portions, wherein the first portion is rotatably mounted to the base via the pivot pin, wherein the second portion is rotatably mounted to the first portion, and wherein the distance D is measured between the second portion and the data storage disk.

11. The method of claim 10 wherein the device comprises an electromagnet mounted to the second portion, and wherein the electromagnet receives the electrical current.

12. The method of claim 11 further comprising the second portion rotating relative to the first portion as the electrical current provided to the electromagnet varies in magnitude.

13. The method of claim 8 further comprising:

illuminating the data storage disk with light as the device rotates about the pivot pin;

detecting light reflected from the data storage disk as the device rotates about the pivot pin;

generating signals corresponding to the detected light as the device rotates about the pivot pin;

monitoring the signals as the device rotates about the pivot pin;

wherein the device rotates in the first plane when the magnitude of the monitored signals are constant as the device rotates about the pivot pin.

14. The method of claim 13 wherein the device comprises first and second portions, wherein the first portion is rotatably mounted to the base via the pivot pin, wherein the second portion is rotatably mounted to the first portion, wherein the second portion is in a fixed position relative to the first portion as the first portion rotates about the pivot pin, and wherein the distance D is measured between the second portion and the data storage disk.

15. The method of claim 14 wherein a light generation device is mounted to the second portion, wherein the light generation device generates the light that illuminates the data storage disk, wherein a light detection device is mounted to the second portion, wherein the light detection device detects the light reflected from the data storage disk, and wherein the light detection device generates the signals corresponding to the detected light.

16. The method of claim 1 wherein the device is configured to optically read or write data to the data storage disk.

17. A method comprising:

rotating a device about a pivot pin, wherein the pivot pin rotatably connects the device to a base, and wherein an angle exists between the pivot pin and the base;

providing electrical current to the device as the device rotates about the pivot pin, wherein the magnitude of the electrical current is proportional or inversely proportional to a distance D separating the device from a first plane, wherein the device is positioned between the base and the first plane;

monitoring electrical current provided to the device as the device rotates about the pivot pin;

adjusting the angle between the base and the pivot pin unless the magnitude of the monitored electrical current is constant as the device rotates about the pivot pin.

18. A method comprising:

rotating a device about a pivot pin, wherein the pivot pin rotatably connects the device to a base, and wherein an angle exists between the pivot pin and the base;

illuminating a data storage disk with light as the device rotates about the pivot pin, wherein the device is positioned between the base and the data storage disk;

detecting light reflected from the data storage disk as the device rotates about the pivot pin;

generating signals corresponding to the detected light as the device rotates about the pivot pin;

monitoring the signals as the device rotates about the pivot pin;

adjusting the angle between the pivot pin and the base unless the magnitude of the monitored signals is constant as the device rotates about the pivot pin.

19. The method of claim 18 wherein the device comprises first and second portions, wherein the first portion is rotatably mounted to the base via the pivot pin, wherein the second portion is rotatably mounted to the first portion, wherein the second portion is in a fixed position relative to the first portion as the first portion rotates about the pivot pin, and wherein the distance D is measured between the second portion and the data storage disk.

20. In an apparatus comprising a base, a data storage disk mounted to the base, an actuator assembly for reading or writing data to the data storage disk, and a pivot pin, wherein the pivot pin rotatably connects the actuator assembly to the base, a method comprising:

rotating the actuator assembly about the pivot pin;

adjusting the angular position of the pivot pin relative to the base unless the actuator assembly rotates in a first plane parallel to a second plane containing a surface of the data storage disk.

* * * * *